(12) United States Patent
Rajkhowa et al.

(10) Patent No.: US 11,475,393 B2
(45) Date of Patent: Oct. 18, 2022

(54) METHOD AND APPARATUS FOR DELIVERY ORDER DISPATCH AND ASSIGNMENT

(71) Applicant: Walmart Apollo, LLC, Bentonville, AR (US)

(72) Inventors: Pratosh Deepak Rajkhowa, Sunnyvale, CA (US); Manish Gupta, Sunnyvale, CA (US); Puneet Srivastava, Fremont, CA (US); Deepak Ramesh Deshpande, San Jose, CA (US); Dinoop Dayanand, Santa Clara, CA (US); Sergey Gavrilov, Sunnyvale, CA (US); Rohit Jain, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 208 days.

(21) Appl. No.: 16/396,413

(22) Filed: Apr. 26, 2019

(65) Prior Publication Data
US 2020/0342395 A1    Oct. 29, 2020

(51) Int. Cl.
*G06Q 10/08* (2012.01)
*G06Q 10/06* (2012.01)
*G06Q 50/30* (2012.01)

(52) U.S. Cl.
CPC ... *G06Q 10/0833* (2013.01); *G06Q 10/06311* (2013.01); *G06Q 10/08355* (2013.01); *G06Q 50/30* (2013.01)

(58) Field of Classification Search
CPC .......... G06Q 10/00–30; G06Q 10/047; G06Q 10/02; G06Q 10/06311;
(Continued)

(56) References Cited

U.S. PATENT DOCUMENTS 5,904,727 A * 5/1999 Prabhakaran ............ G08G 1/20
                                                              701/454
10,026,055 B2 * 7/2018 Riel-Dalpe ........ G06Q 10/0833
(Continued)

OTHER PUBLICATIONS

Richens, "How we use Machine Learning to match Drivers & Riders", Nov. 15, 2018, <https://www.gojek.io/blog/how-we-use-machine-learning-to-match-drivers-riders>, gojek tech. (Year: 2018).*

*Primary Examiner* — Jeff Zimmerman
*Assistant Examiner* — Brian A Tallman
(74) *Attorney, Agent, or Firm* — Duane Morris LLP; Manita Rawat

(57) ABSTRACT

This application relates to apparatus and methods for determining, assigning, and displaying order deliveries. In some examples, a computing device may obtain order data identifying at least one order for delivery during a timeslot. The computing device may transmit, to a driver's computing device, a request for deliveries for a first price during the timeslot. The computing device may receive, from the driver's computing device, a response accepting the request. The computing device may then assign the driver to the order, and determine a delivery status based on the assignment of the first driver to the first order. The delivery status may identify, for example, that the order has been assigned to the driver, an estimated delivery time, the number of items being delivered, the weight of the items, and a route taken by the driver. The computing device may also display the delivery status.

17 Claims, 18 Drawing Sheets

(58) Field of Classification Search
CPC ..... G06Q 10/083–08355; G06Q 50/30; G01C 21/343
See application file for complete search history.

(56) References Cited

U.S. PATENT DOCUMENTS

| | | | |
|---|---|---|---|
| 10,133,995 B1* | 11/2018 | Reiss | G06Q 10/063114 |
| 2003/0087051 A1* | 5/2003 | Murray | B65B 25/001 |
| | | | 428/35.2 |
| 2005/0251330 A1* | 11/2005 | Waterhouse | G08G 1/202 |
| | | | 701/465 |
| 2006/0235739 A1* | 10/2006 | Levis | G06Q 10/08 |
| | | | 705/1.1 |
| 2009/0216600 A1* | 8/2009 | Hill | G06Q 50/30 |
| | | | 705/7.14 |
| 2012/0239452 A1* | 9/2012 | Trivedi | G06Q 10/00 |
| | | | 705/7.22 |
| 2013/0289873 A1* | 10/2013 | Mitchell | G06Q 10/06 |
| | | | 701/482 |
| 2014/0278635 A1* | 9/2014 | Fulton | G06Q 10/063112 |
| | | | 705/7.14 |
| 2015/0161564 A1* | 6/2015 | Sweeney | G06Q 10/063114 |
| | | | 705/338 |
| 2015/0356703 A1* | 12/2015 | Ellis | G06Q 50/30 |
| | | | 705/7.17 |
| 2017/0236091 A1* | 8/2017 | Putcha | G06Q 10/0833 |
| | | | 705/333 |
| 2017/0286893 A1* | 10/2017 | Clark | G06Q 10/083 |
| 2017/0293925 A1* | 10/2017 | Marueli | G06Q 50/30 |
| 2018/0052462 A1* | 2/2018 | Arena | G06Q 50/30 |
| 2018/0211186 A1* | 7/2018 | Rakah | B60W 60/00253 |
| 2018/0232685 A1* | 8/2018 | Champ | G06Q 10/083 |
| 2018/0315319 A1* | 11/2018 | Spector | G06Q 10/06316 |
| 2018/0349844 A1* | 12/2018 | Bounasser | G06Q 10/08355 |

\* cited by examiner

| DRIVER RANK — 502 | OFFER PRICE — 504 |
|---|---|
| 1 – 6 | $ 9.30 |
| 7 | $ 11.30 |
| 8 | $ 13.30 |
| 9 | $ 15.30 |
| 10 | $ 15.30 |
| FIRST POLL | $ 20.00 |
| LAST POLL | $ 25.00 |

| Store # | Delivery time slot / Date | Trip # | Order # | Zip Code | # of items | Weight | Delivery status | Picking status | Observations | |
|---|---|---|---|---|---|---|---|---|---|---|
| 5554 | 11:00 AM – 12:00 PM 08/15/2018 | 1 – 1 Orders | 7497180142484 | 94536 | 0 | 28 | Unassigned | Manifest created | Delayed by 4d 22hrs 15min ETA: 12:00 PM | ASSIGN DRIVER |
| 5554 | 01:00 PM – 02:00 PM 08/15/2018 | 4 – 1 Orders | 7497180152537 | 94536 | 0 | 28 | Unassigned | Manifest created | Delayed by 4d 20hrs 15min ETA: 02:00 PM | ASSIGN DRIVER |
| 5554 | 03:00 PM – 04:00 PM 08/15/2018 | 5 – 1 Orders | 7497180122595 | 94536 | 0 | 28 | Unassigned | Manifest created | Delayed by 4d 18hrs 15min ETA: 04:00 PM | ASSIGN DRIVER |

My market 7 delayed / Total orders
3 orders

3 Unassigned / 3 delayed
4 Courier requested / 4 delayed
0 En Route to Pick Up
0 At Pick Up
0 En Route to Drop Off
0 Completed Market: US | Market/Store | Date
Dispatcher Name Search by order id or trip id

FIG. 6I

| Store # | Delivery time slot / Date | Trip # | Order # | Zip Code | # of items | Weight | Delivery status | Picking status | Observations |
|---|---|---|---|---|---|---|---|---|---|
| 5554 | 11:00 AM – 12:00 PM 08/15/2018 | 1 1 Orders | 749718014 2484 | 94536 | 0 | 28 | Unassigned | Manifest created | Delayed by 4d 22hrs 20min ETA: 12:00 PM |
| 5554 | 01:00 PM – 02:00 PM 08/15/2018 | 4 1 Orders | 749718015 2537 | 94536 | 0 | 28 | Unassigned | Manifest created | Delayed by 4d 20hrs 20min ETA: 02:00 PM |
| 5554 | 03:00 PM – 04:00 PM 08/15/2018 | 5 1 Orders | 749718012 2595 | 94536 | 0 | 28 | Unassigned | Manifest created | Delayed by 4d 18hrs 20min ETA: 04:00 PM |

ORDER
- Reschedule
- Add driver
- Release
- Cancel

TRIP
- Change driver
- Cancel
- Force complete
- Release

METHOD AND APPARATUS FOR DELIVERY ORDER DISPATCH AND ASSIGNMENT

TECHNICAL FIELD

The disclosure relates generally to delivery services and, more specifically, to delivery management systems.

BACKGROUND

At least some retailers deliver purchased goods, such as groceries, to a customer. When an order is placed, the retailers must gather the purchased goods and schedule them for delivery. Some delivery management systems allow a customer to select a delivery window specifying a range of time when the goods may be delivered. Once scheduled, a delivery vehicle may collect the purchased goods for an order from a warehouse or store, and deliver the purchased goods to a customer at a specified delivery address, such as to the customer's home. Some delivery management systems allow delivery drivers to specify times when they are available for delivery. The delivery management systems may then assign deliveries with selected delivery windows that coincide with the times the delivery drivers are available to make deliveries.

These delivery management systems, however, have drawbacks. For example, sometimes there is a scarcity of drivers or, in some examples, no drivers that are willing to deliver items during a delivery window. As a result, the items may go undelivered, or they may be delivered at a later time than requested or expected. In some examples, drivers may attempt to deliver items later than scheduled. Customers, however, may not be home to accept late deliveries. These and other drawbacks may lead retailers to suffer economic and reputational losses.

SUMMARY

The embodiments described herein may optimize delivery management systems and services by, for example, improving and/or ensuring on-time deliveries, reducing the number of undelivered orders, or more efficiently scheduling delivery vehicle drivers. As a result, a retailer employing one or more of these embodiments may be benefit by expending less effort and time in scheduling activities, more efficiently scheduling deliveries, decreasing costs associated with the deliveries, and improving customer service. Those of ordinary skill in the art may recognize additional benefits as well.

In some embodiments, a computing device is configured to obtain order data identifying at least a first order for delivery during a timeslot. The computing device may transmit, to a first associate device, a first request for deliveries for a first price during the timeslot. The computing device may receive a first response accepting the first request, and determine a first driver based on the first response. For example, the computing device may determine the first driver based on a driver list. The computing device may assign the first driver to the first order, and determine a delivery status based on the assignment of the first driver to the first order. The computing device may determine data related to the order and the delivery of the order, such as a delivery status. In some examples, the computing device may receive location data identifying a current position of the first associate device, and may update the delivery status based on the received location data.

In some embodiments, a method is provided that includes obtaining order data identifying at least a first order for delivery during a timeslot. The method may include transmitting, to a first associate device, a first request for deliveries for a first price during the timeslot. The method may include receiving a first response accepting the first request, and determine a first driver based on the first response. For example, the method may include determining the first driver based on a driver list. The method may include assigning the first driver to the first order, and determining a delivery status based on the assignment of the first driver to the first order. The method may include determining data related to the order and the delivery of the order, such as a delivery status. In some examples, the method may include receiving location data identifying a current position of the first associate device, and updating the delivery status based on the received location data.

In yet other embodiments, a non-transitory computer readable medium has instructions stored thereon, where the instructions, when executed by at least one processor, cause a device to perform operations that include obtaining order data identifying at least a first order for delivery during a timeslot. The operations may include transmitting, to a first associate device, a first request for deliveries for a first price during the timeslot. The operations may include receiving a first response accepting the first request, and determine a first driver based on the first response. For example, the operations may include determining the first driver based on a driver list. The operations may include assigning the first driver to the first order, and determining a delivery status based on the assignment of the first driver to the first order. The operations may also include determining data related to the order and the delivery of the order, such as a delivery status. In some examples, the operations may include receiving location data identifying a current position of the first associate device, and updating the delivery status based on the received location data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 5A illustrates a pricing model that may be generated by the delivery management computing device of FIG. 1 in accordance with some embodiments;

FIG. 6A illustrates a view of an application that may be executed by the delivery management computing device of FIG. 1 in accordance with some embodiments;

FIG. 6E illustrates delivery trip details for the delivery assignments of the application of FIG. 6A that may be executed by the delivery management computing device of FIG. 1 in accordance with some embodiments;

FIG. 6G illustrates order details for the delivery assignments of the application of FIG. 6A that may be executed by the delivery management computing device of FIG. 1 in accordance with some embodiments;

FIG. 6H illustrates driver assignments to delivery orders of the application of FIG. 6A that may be executed by the delivery management computing device of FIG. 1 in accordance with some embodiments;

FIG. 6I illustrates order and trip modifications to delivery orders of the application of FIG. 6A that may be executed by the delivery management computing device of FIG. 1 in accordance with some embodiments;

DETAILED DESCRIPTION

Figure 1:
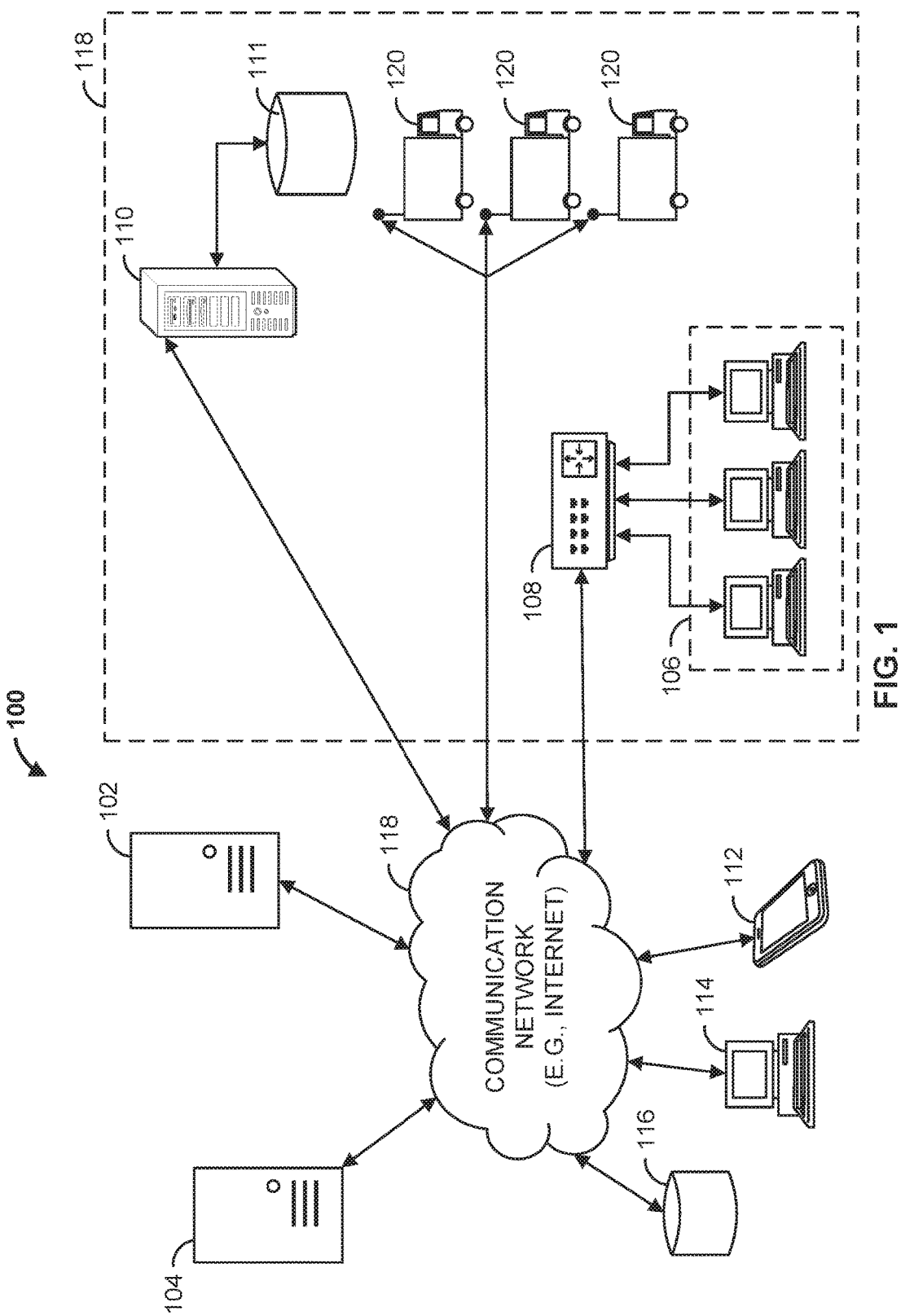
FIG. 1 is a block diagram of a delivery management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a delivery management system 100 that includes a delivery management computing device 102 (e.g., a server, such as an application server), a web hosting device 104 (e.g., a web server), workstation(s) 106, database 116, scheduling server 110, and multiple customer computing devices 112, 114 operatively coupled over network 118. Delivery management computing device 102, web hosting device 104, workstation(s) 106, scheduling server 110, and multiple customer computing devices 112, 114 can each be any suitable computing device that includes any hardware or hardware and software combination for processing and handling information. In addition, each can transmit data to, and receive data from, communication network 118.

Delivery management system 100 may also include one or more delivery vehicles 120, which may be operated by delivery personnel. The delivery personnel may operate an associate device, which may be any suitable computing device such as a mobile device. The associate device may include a transceiver which allows for communication over network 118. For example, the associate device may communicate over network 118 with one or more of delivery management computing device 102 and scheduling server 110. The associate device may include a location device such as a global positioning system (GPS) device that reports location data, such as longitude and latitude data. The associate device may also execute one or more applications. The application may include a graphical user interface that is displayed via a display of the associate device.

For example, each of delivery management computing device 102, web hosting device 104, workstation(s) 106, scheduling server 110, and multiple customer computing devices 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates two customer computing devices 112, 114, delivery management system 100 can include any number of customer computing devices 112, 114. Similarly, delivery management system 100 can include any number of workstation(s) 106, 108, scheduling servers 110, delivery management computing devices 102, delivery vehicles 120, web hosting devices 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Delivery management computing device 102, web hosting device 104, workstation(s) 106, 108, and scheduling server 110 may be operated by a retailer. Customer computing devices 112, 114 may be computing devices operated by customers of a retailer. In some examples, web hosting device 104 hosts one or more web pages for the retailer. Each customer computing device 112, 114 may be operable to access the one or more webpages hosted by web hosting device 104 over communication network 118. For example, a customer operating a customer computing device 112, 114 may view a retailer's website hosted by web hosting device 104 as displayed by the customer computing device 112, 114, and may purchase products, such as goods or services, from the retailer's website by interacting with the website via the customer computing device 112, 114. The customer may also be able to request that the order be delivered. In some examples, scheduling server 110 is operable to schedule the orders for delivery with delivery vehicles 120. For example, upon receiving a request for the delivery of an order, scheduling server 110 may schedule the order to be delivered by a delivery associate operating delivery vehicle 120. The delivery associate may receive the request via a computing device, such as a mobile device. Scheduling server 110 is communicatively coupled to database 111, which may store scheduling data identifying the scheduled orders.

Workstation(s) 106, 108 may be operably coupled to communication network 118 via a router (or switch) 108. As such, workstation(s) 106, 108 can communicate with delivery management computing device 102 over communication network 118. For example, workstations(s) 106, 108 may transmit data, such as purchase order data, to delivery management computing device 102. Similarly, workstation(s) 106, 108 may receive data from delivery management computing device 102. Workstation(s) 106, 108 along with router 108 may be located at a retail location 118, such as a store or warehouse where purchased items are stored. Scheduling server 110 may also be located at retail location 118, and may schedule orders for delivery to be delivered from retail location 118 by delivery associates operating delivery vehicles 120.

Delivery management computing device 102 is operable to communicate with database 116 over communication network 118. For example, delivery management computing device 102 can store data to, and read data from, database 116. Database 116 may be a tangible, non-transitory memory. For example, database 116 may be a remote storage device, such as a cloud-based server, a memory device on another application server, a networked computer, or any other suitable remote storage. Although shown remote to delivery management computing device 102, in some examples, database 116 can be a local storage device, such as a hard drive, a non-volatile memory, or a USB stick. Database 116 may store purchase order data. For example, a customer may purchase good from a retailer's website hosted by web hosting device 104. Web hosting device 104 may store purchase order data identifying and characterizing the order in database 116. Delivery management computing device 102 may then obtain the purchase order data from database 116.

In some examples, delivery management computing device 102 schedules one or more orders for delivery with one or more drivers operating delivery vehicles 120. Delivery management computing device 102 may obtain delivery orders placed by the customer on a website, such as a website hosted by web server 104. The delivery orders may identify the day of the delivery, delivery location, customer contact information such as a phone number, order details (e.g., items ordered), and an identification of the store that will fulfill the order (e.g., store name or address). In some examples, the delivery orders identify a delivery timeslot during which the order is to be delivered. Beginning at a period of time before each delivery timeslot (e.g., a few hours), delivery management computing device 102 determines a driver and delivery price at different points in time to generate delivery offers to drivers. Delivery management computing device 102 may transmit the delivery offers to the associate device operated by the drivers of delivery vehicles 120. Delivery management computing device 102 then allows a period of time (e.g., 15 minutes) for each driver to accept the offer. If an offer is not accepted, delivery management computing device 102 transmits the offer to another driver.

In some examples, delivery management computing device 102 communicates with an application executing on the associate device operated by the driver. For example, delivery management computing device 102 may transmit information, such as the delivery offers, to the associate device which are then displayed by the application. In some examples, delivery management computing device 102 can track the location of the associate device based on receiving GPS data from the associate device. For example, the application may read GPS data from the associate device, and cause the associate device to transmit the GPS data to delivery management computing device 102. Delivery management computing device 102 may generate a communication to a customer based on the location of the driver. For example, delivery management computing device 102 may determine that the driver is enroute to drop off a delivery order, and may generate, and transmit, a communication (e.g., an email or short messaging service (SMS)) with driver details, a tracking link, and customer details to the customer via customer computing device 112, 114.

In some examples, delivery management computing device 102 determines whether an order includes temperature sensitive items, such as frozen items (e.g., ice cream), and may cancel a delivery order if the order has not been delivered within a maximum period of time. For example, delivery management computing device 102 may transmit an order cancellation message to the driver application if the driver has not delivered the order with the maximum period of time. In some examples, delivery management computing device 102 reschedules the delivery order with another driver. In some examples, delivery management computing device 102 determines if a delivery order as any alcohol items. If an order does include alcohol, delivery management computing device 102 may transmit a message to the driver application reminding the driver to collect proof of age from the customer upon delivery of the order.

In some examples, delivery management computing device 102 may transmit communications (via, e.g., SMS) to store associates of any driver delays in picking up an order from the store. In some examples, delivery management computing device 102 may add multiple delivery vehicles 120 to a same order, cancel a delivery, assign a driver to an order, un-assign a driver from a delivery order, and forcefully close a delivery order. In some examples, delivery management computing device 102 may reschedule a delivery order based on one or more of a delivery time, delivery timeslot, driver working hours, or driver supply.

Delivery management computing device 102 may identify delivered orders, and cause the customer to be charged for the order. For example, Delivery management computing device 102 may provide for the delivery order to be charged to a credit card of the customer. Delivery management computing device 102 may also allow for the payment of a driver for a delivered order. In some examples, the payment is according to a previously agreed price. Delivery management computing device 102 may also track returned items, such as items a customer has rejected, back to the store so that appropriate action can be taken (e.g., scheduled for re-delivery, re-stocking of the returned item, etc.).

In some examples, delivery management computing device 102 may transmit a general timeslot availability request message that identifies one or more time slots for deliveries to one or more drivers of delivery vehicles 120 (via, e.g., scheduling server 110). Each general timeslot availability request message may identify a day, a time slot, and a base delivery price to be paid to the driver of the delivery vehicle 120. The time slot may be a range of time (e.g., 3-5 pm) on a particular day (e.g., Saturday). The driver of delivery vehicle 120 may accept or reject the general timeslot availability request. If a general timeslot availability request is rejected, by a first delivery vehicle 120, delivery management computing device 102 may transmit the general timeslot availability request to a second delivery vehicle 120.

If the general timeslot availability request is accepted, delivery management computing device 102 may receive one or more general timeslot availability responses accepting the request to deliver goods during the specified times. Upon working the scheduled delivery times (e.g., and delivering the scheduled delivery orders), the drivers are paid the base delivery price.

In some examples, if no, or not enough, drivers accept the request to deliver goods, delivery management computing device 102 may transmit a surged price timeslot availability request message that identifies one or more time slots, as well as a surged price (e.g., greater than the base price identified in the general timeslot availability request message), for deliveries to one or more drivers of delivery vehicles 120 (via, e.g., scheduling server 110). In response, delivery management computing device 102 may receive one or more surged price timeslot availability responses accepting the request to deliver goods during the specified times and for the surged price. Upon working the scheduled delivery times, the drivers are paid the surged price for the deliveries.

In some examples, delivery management computing device 102 determines how many and/or which drivers to transmit timeslot availability request messages to. In some examples, delivery management computing device 102 modifies the surge price based on the number of drivers the timeslot availability request messages are transmitted to.

In some examples, delivery management computing device 102 determines a maximum surge price, a minimum surge price, and total driver payouts (e.g., per timeslot, per day, etc.). The maximum surge price may be a maximum price that is to be paid to a driver for delivery during a time slot, whereas the minimum surge price is a minimum price to be paid to the driver for delivery during the timeslot. For example, delivery management computing device 102 may transmit surged price timeslot availability request messages to one or more delivery vehicles 120 identifying a minimum surge price. Delivery management computing device 102 may wait a period of time for one or more surged price timeslot availability response messages accepting the requests. If no, or not enough, surged price timeslot availability response messages are received within the period of time (e.g., the delivery request expired), delivery management computing device 102 may generate an increased surged price, and transmit one or more surged price timeslot availability request messages with the increased surge price to one or more delivery vehicles 120. Delivery management computing device 102 may continue to increase the surged price periodically until either enough delivery vehicles 120 have accepted the requests, or until a delivery deadline time is reached. The delivery deadline time may be a minimum amount of time (e.g., 12 hours, a day) before the orders are to be delivered. If no, or not enough, delivery vehicles 102 accept the request by the delivery deadline time, delivery management computing device 102 may transmit a request for delivery of one or more of the orders to a third-party, such as a delivery company.

In some examples, delivery management computing device 102 determines surge prices in consideration of one or more payment rules. For example, delivery management computing device 102 determines surge prices that will satisfy (e.g., not violate) one or more payment rules. Payment rules may include rules that a retailer follows to assure that delivery drivers receive a fair share of delivery requests. For example, a payment rule may require that each driver is offered a minimum amount or percentage of delivery request offers. As another example, a payment rule may require that drivers with higher delivery request acceptance rates receive a higher amount or percentage of delivery request offers.

Figure 2:
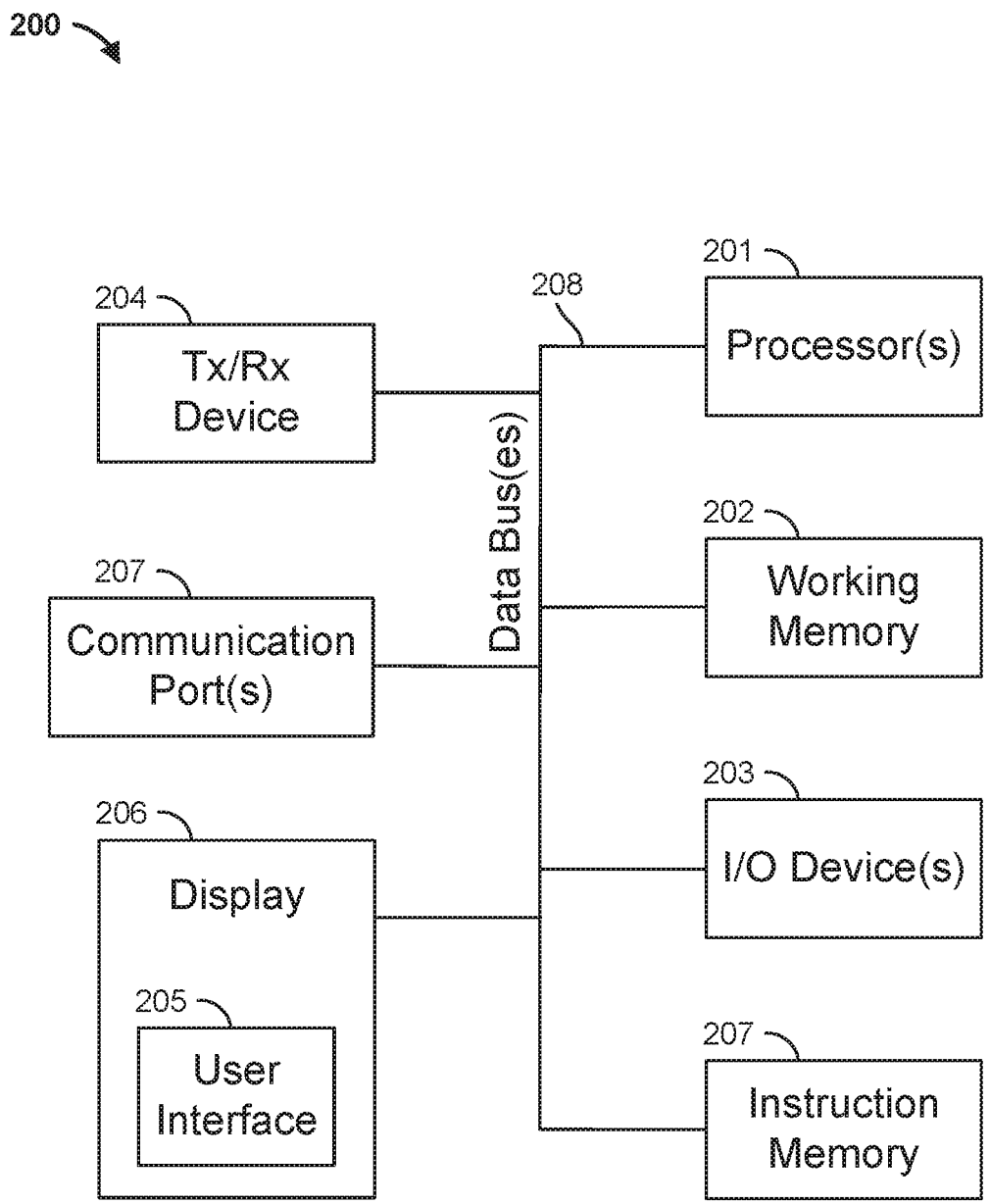
FIG. 2 is a block diagram of the delivery management computing device of FIG. 1 in accordance with some embodiments.

FIG. 2 illustrates an example of the delivery management computing device 102 of FIG. 1. Delivery management computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of delivery management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as scheduling and delivery price data.

Display 206 can display user interface 205. User interfaces 205 can enable user interaction with delivery management computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 delivery management computing device 102 will be operating in. Processor(s) 201 is operable to receive data from, or send data to, a network, such as communication network 118 of FIG. 1, via transceiver 204.

Figure 3:
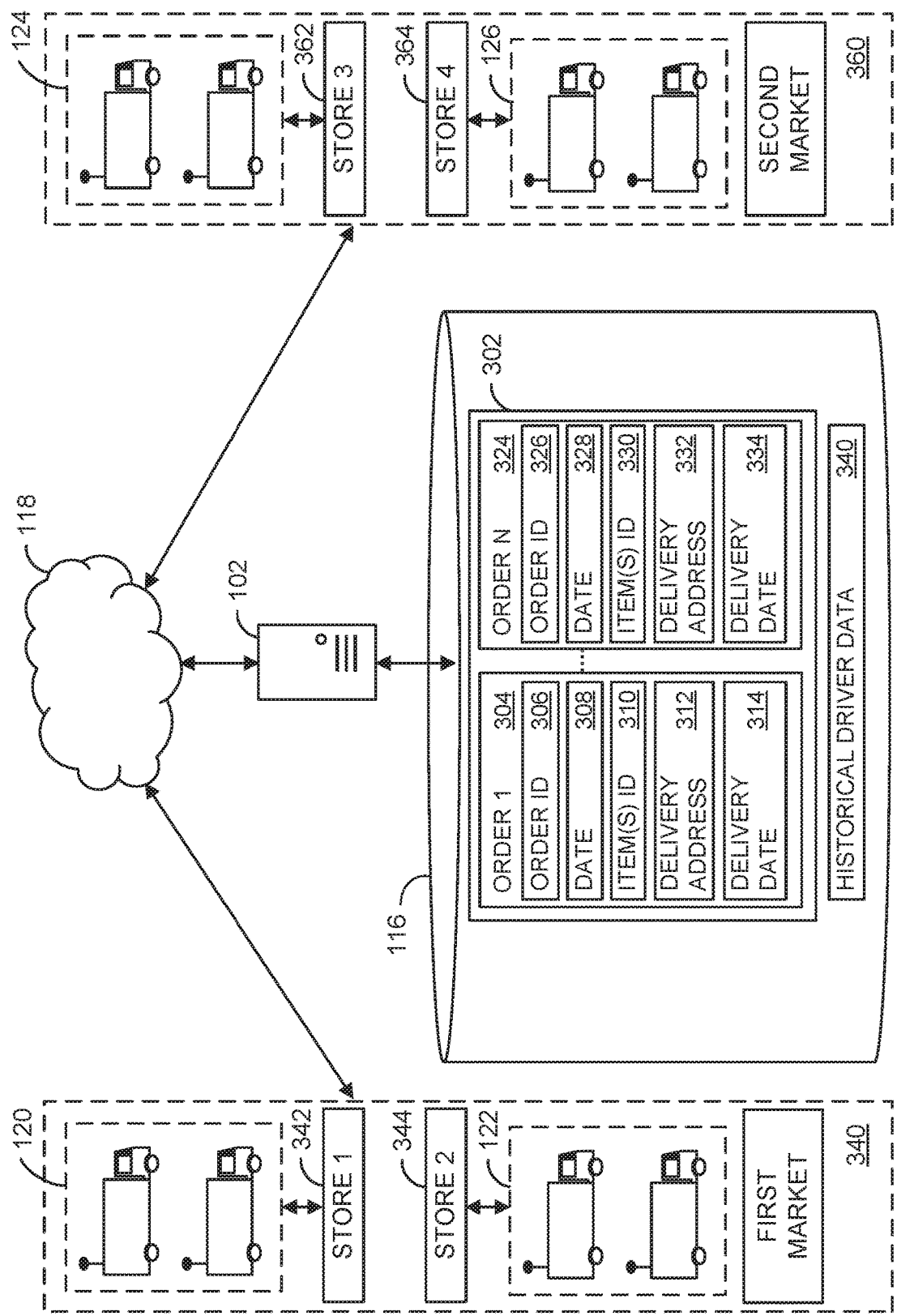
FIG. 3 illustrates a block diagram of various portions of the delivery management system of FIG. 1 deployed across multiple markets in accordance with some embodiments.

FIG. 3 illustrates the delivery management computing device 102 of FIG. 1 in communication with delivery vehicles associated with multiple stores in multiple markets 340, 360. First market 340 includes a first store 342 and a second store 344, and second market 360 includes a third store 362 and further store 364. Although only two stores are shown for each market, first market 340 and second market 360 may each include any number of stores. First store 342 is associated with a plurality of delivery vehicles 120, and second store is associated with a plurality of delivery vehicles 122. For example, delivery vehicles 120 may pick up orders from first store 342, and deliver the orders to a geographical area serviced by first store 342. Similarly, delivery vehicles 122 may pick up orders from second store 344, and deliver the orders to a geographical area serviced by second store 344. Delivery vehicles 124 may pick up orders from third store 362, and deliver the orders to a geographical area serviced by third store 362. Delivery vehicles 126 may pick up orders from fourth store 364, and deliver the orders to a geographical area serviced by fourth store 364.

Delivery management computing device 102 may request, from each delivery vehicle, driver availability to deliver orders, and may receive a response to each request. For example, delivery management computing device 102 may transmit general timeslot availability requests and surged price timeslot availability requests to delivery vehicles 120 and, in response, may receive general timeslot availability responses and surged price timeslot availability responses from delivery vehicles 120. Similarly, delivery management computing device 102 may transmit general timeslot availability requests and surged price timeslot availability requests to delivery vehicles 122 and, in response, may receive general timeslot availability responses and surged price timeslot availability responses from delivery vehicles 122. Delivery management computing device 102 may transmit general timeslot availability requests and surged price timeslot availability requests to delivery vehicles 124 and, in response, may receive general timeslot availability responses and surged price timeslot availability responses from delivery vehicles 124. Delivery management computing device 102 may also transmit general timeslot availability requests and surged price timeslot availability requests to delivery vehicles 126 and, in response, may receive general timeslot availability responses and surged price timeslot availability responses from delivery vehicles 126.

Delivery management computing device 102 may request drivers to deliver orders based on order data 302, which may be stored in database 116. For example, order data 302 may identify online orders, such as orders placed on a website hosted by web server 104, or in-store orders, that are scheduled for delivery. Order data 302 may include data identifying a first order 304 up to a $N^{th}$ order 324. First order 304 may include an order ID 306, which may identify the order. First order 304 may also include a date 308, which may be the date the order was placed, and one or more item IDs 310, where each item ID 310 identifies an ordered item. In some examples, item IDs 310 are sequence numbers. In some examples, the item IDs 310 are coordinate positions within a warehouse or store where the items are located. First order 304 may also include a delivery address 312 identifying the delivery address for first order 304, and a delivery date 314 identifying the date of delivery for first order 304. Similarly, $N^{th}$ order 324 may include one or more of order ID 326, date 328, item(s) ID 330, delivery address 332, and delivery date 334.

In some examples, delivery management computing device 102 may request delivery availability (e.g., may transmit general timeslot availability requests and/or surged price timeslot availability requests) for a subset of drivers out of a pool of total drivers (e.g., drivers that have registered to deliver items for the retailer). If not enough drivers accept the requests (e.g., the delivery requests expired), delivery management computing device 102 may request delivery availability from another subset of drivers out of the pool of drivers (e.g., a subset of drivers that are different from the original subset of drivers).

In some examples, the subset of drivers is one. In other words, delivery management computing device 102 may request delivery availability of one driver at a time. For example, assume that customers placed twenty orders with a retailer via a website hosted by webserver 104, where each order is to be delivered on a particular day during a particular time period (e.g., Friday, between 5 pm-7 pm). Delivery management computing device 102 may determine that one driver can deliver the twenty orders within the time period, and may request driver availability from a first driver of a driver list (e.g., a list of ranked drivers servicing the delivery area where the orders are to be delivered). Assuming that driver does not respond to the request (e.g., the deliver request expired), delivery management computing device 102 may then request driver availability from the second driver on the ranked list. Delivery management computing device 102 may continue requesting drivers, one at a time, until the delivery request has been accepted.

The driver list may be a list of drivers ranked based on historical driver data 340, which may be stored in database 116. Historical driver data 340 may include historical driver acceptance rates, which identifies the delivery acceptance rates for various drivers. For example, driver acceptance rates may identify, for each driver, the percentage of general timeslot availability requests and/or surged price timeslot availability requests that have been accepted. In some examples, the delivery acceptance rates may identify an acceptance rate for each of multiple periods of time, such as during differing delivery timeslots, for each driver. Historical driver data 340 may also identify a driver's acceptance position, such as an average acceptance position over a period of time. The acceptance position identifies the number the driver was to accept a delivery request. For example, if the driver was the third driver that delivery management computing device 102 offered delivery services to for delivery during a particular timeslot and the driver accepts, the acceptance position of the driver is three.

Historical driver data 340 may also include data identifying on-time deliveries, late deliveries, no-show deliveries, and customer ratings. On-time deliveries may include, for example, a number of on-time deliveries (e.g., deliveries delivered during an assigned timeslot) over a period of time (e.g., over the last month, year, etc.). Late deliveries include a number of deliveries over a period of time where the driver arrived after the assigned timeslot. No-show deliveries may include deliveries, over a period of time, in which the driver failed to arrive at the delivery location. Drivers may be ranked in a driver list based on one or more of these factors. For example, delivery management computing device 102 may apply a weight to one or more of the factors, and may determine a final ranking based on the weighted factors.

In some examples, delivery management computing device 102 increases a surged price for each delivery request. For example, the first driver may be offered a base price (e.g., $9), the second driver may be offered a surged price that is higher than the base price (e.g., $12), and a third driver may be offered a surged price that is greater than the surged price offered to the second driver (e.g., $15). In some examples, a first number of drivers are offered the same price (e.g., the same base price). If enough drivers do not accept the requests, delivery management computing device 102 may offer a surged price to the next driver. Delivery management computing device 102 may then increase the surged price to each subsequent driver.

In some examples, delivery management computing device 102 requests driver availability for a same timeslot from a plurality of drivers at one time. For example, delivery management computing device 102 may determine that, based on the number of orders for delivery during a particular timeslot, multiple drivers are required to make the deliveries. Delivery management computing device 102 may request driver availability from a number of drivers on the ranked driver list required to make the deliveries. For example, if three drivers are required, delivery management computing device 102 may request driver availability from the top three ranked drivers. Based on a number of responses, delivery management computing device 102 may request driver availability from other drivers on the ranked list. For example, if one driver accepts, after the delivery requests have expired, delivery management computing device 102 may request from the next two drivers on the ranked list, i.e., the fourth and fifth drivers.

In some examples, delivery management computing device 102 transmits delivery requests to multiple drivers simultaneously (e.g., polls, or publishes to, the drivers), such as to all drivers registered with a retailer to deliver orders. The delivery requests may offer a surged price for delivery services during a particular timeslot. The surged price may be greater than any previously offered to an individual driver. For example, as described further below, FIG. 5A illustrates example surge pricing requests.

Figure 4:
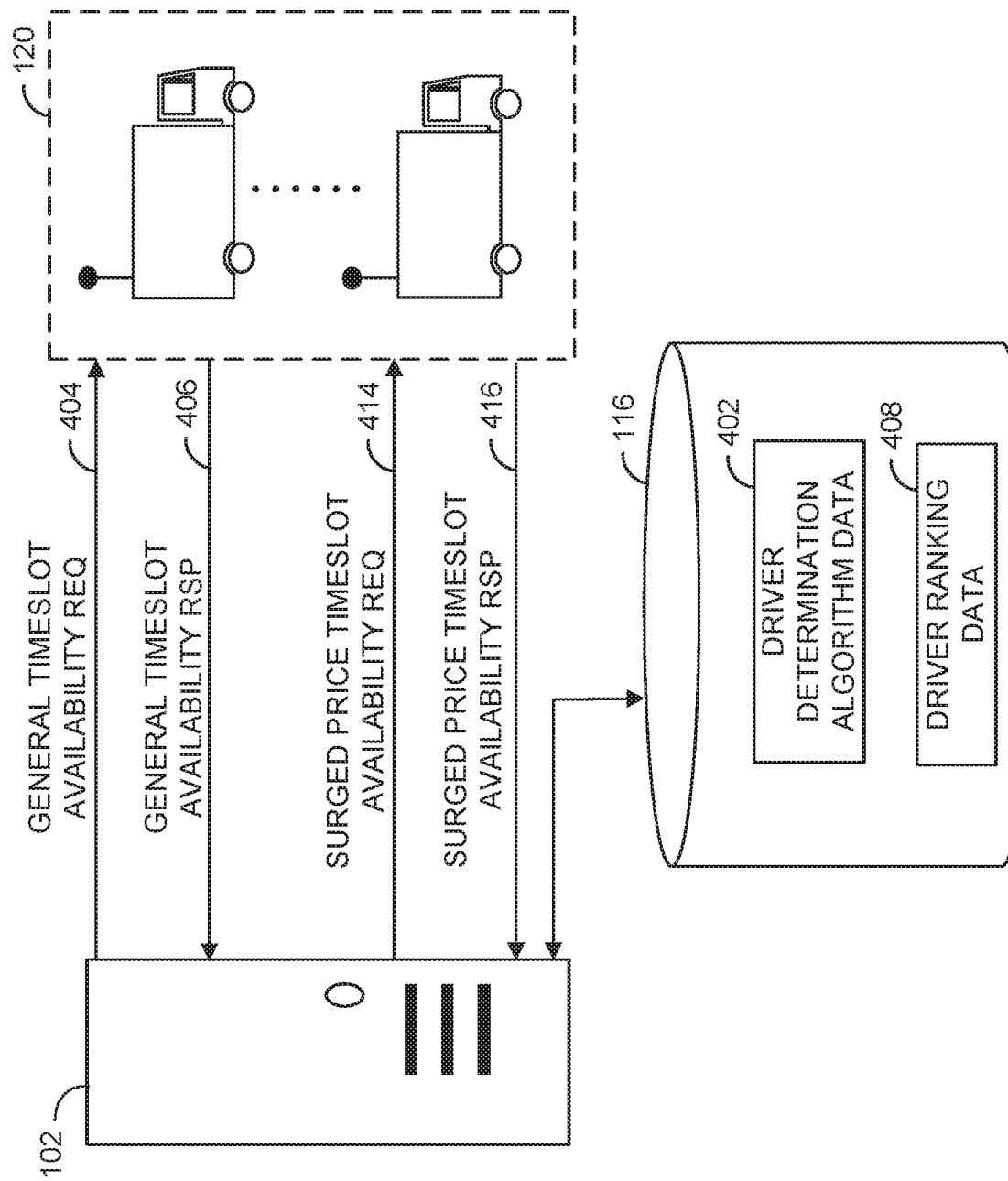
FIG. 4 illustrates another block diagram of portions of the delivery management system of FIG. 1 in accordance with some embodiments.

FIG. 4 illustrates delivery management computing device 102 in communication with a plurality of delivery vehicles 120. As illustrated, delivery management computing device 102 may transmit a general timeslot availability request 404 to one or more delivery vehicles 120. The general timeslot availability request 404 may identify a particular timeslot, and in some examples, a delivery price, which may be a base price. If delivery vehicle 120 wishes to accept the request, delivery vehicle 120 may respond with a general timeslot availability response 406. If, however, no, or not enough, delivery vehicles 120 accept general timeslot availability requests 406, delivery management computing device 120 may determine a surged price to offer for delivery services during the same timeslot. Delivery management computing device 102 may then transmit a surged price timeslot availability request 414 to the one or more delivery vehicles 120. For example, delivery management computing device 102 may transmit the surged price timeslot availability request 414 if no general timeslot availability response 406 is received within a maximum amount of time (e.g., 15 minutes) of transmitting the general timeslot availability request 404. If delivery vehicle 120 wishes to accept the surged price timeslot availability request 414, delivery vehicle 120 may respond with a surged price timeslot availability response 416.

Delivery management computing device 120 may request delivery from a driver in a driver list, such as a driver list identified by driver ranking data 408. Driver ranking data 408 may be a driver list generated based on historical driver data 340, for example. To generate the driver list, delivery management computing device 120 may execute one or more algorithms, such as linear, logarithmic, or polynomial algorithms, identified by driver determination algorithm data 402. In some examples, driver determination algorithm data 402 identifies one or more machine learning algorithms that operate on, for example, historical driver data 340.

FIG. 5A illustrates example surge pricing requests. In this example, delivery management computing device 102 offers a delivery request with a base price 580, via a general timeslot availability request, for example, to a first driver of a ranked list 502. Assuming the first driver does not accept the delivery request (e.g., the request expired), delivery management computing device 102 offers the delivery request to the second driver of the ranked list 502 at the same base price 580. Similarly, the delivery request may be offered to the third, fourth, fifth, and sixth drivers of the ranked list 502 at the same base price 580.

Continuing to assume that no drivers have accepted a request, delivery management computing device 102 offers the delivery request to the seventh driver at a surged price 582 via, for example, a surged price timeslot availability request. Assuming the seventh driver does not accept the request, delivery management computing device 102 may offer the delivery request to the eight driver of the ranked list at a surged price 584, then, assuming the eight driver did not accept the delivery request, to the ninth driver of the ranked list at a surged price 586 greater than that offered to the eight driver. Assuming the ninth driver does not accept the delivery request, the deliver request is offered to the tenth driver of the ranked list at a surged price 588, which is greater than the surged price offered to the ninth driver.

In some examples, if the tenth driver did not accept the delivery request, delivery management computing device 102 may execute a first poll 589 where all ten drivers receive a request for the delivery request at a surged price 590 greater than that offered to the tenth driver. If no drivers accept the delivery request, delivery management computing device 102 may execute a second (and, in this example, last) poll 591 where all ten drivers receive a request for the delivery request at an even higher surged price 592. If no drivers respond to the last poll 591, the deliveries may be assigned to a third-party for delivery. In some examples, if a driver does accept a delivery request conducted by poll, the first driver (or, if more than one driver is needed, the first number of drivers) to respond is awarded the deliveries.

Figure 5B:
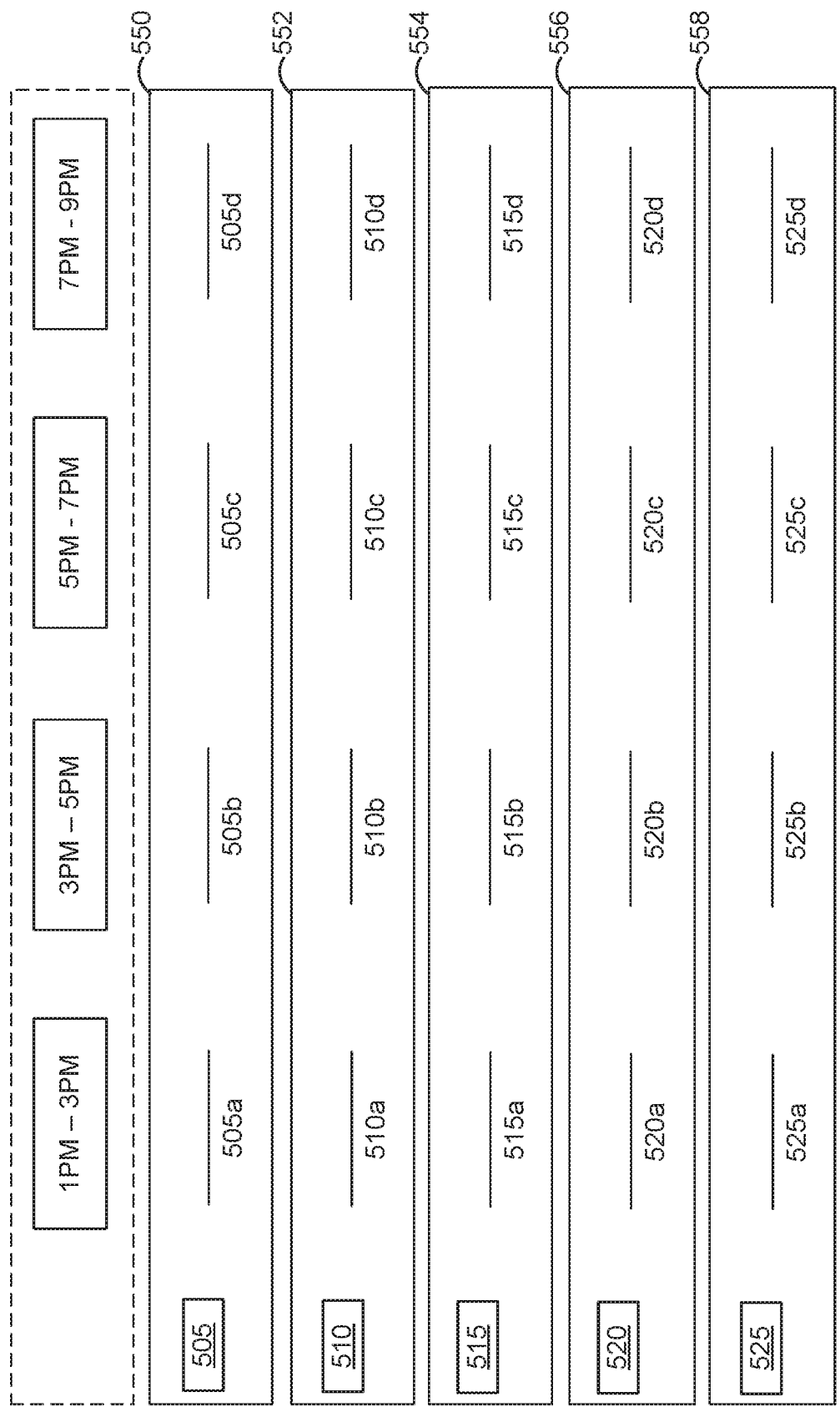
FIG. 5B illustrates a diagram of delivery vehicle timeslot requests in accordance with some embodiments.

FIG. 5B illustrates a plurality of general timeslot availability requests 550, 552, 554, 556, 558 which may be transmitted by delivery management computing device 102 to a computing device of drivers of corresponding delivery vehicles 505, 510, 515, 520, 525. Each general timeslot availability request 550, 552, 554, 556, 558 may be displayed, for example, by a display of the computing device. In this example, each general timeslot availability request 550, 552, 554, 556, 558 includes a number of timeslots that a driver may accept as being available to deliver orders, such as batched orders. For example, general timeslot availability request 550 includes timeslots 505a-505d. Timeslot request 505a is a request for delivery availability between the hours of 1 pm and 3 pm. Timeslot request 505b is a request for delivery availability between the hours of 3 pm and 5 pm, timeslot request 505c is a request for delivery availability between the hours of 5 pm and 7 pm, and timeslot request 505d is a request for delivery availability between the hours of 7 pm and 9 pm. Likewise, general timeslot availability request 552 includes timeslots 510a-510d, general timeslot availability request 554 includes timeslots 515a-515d, vehicle timeslot request 556 includes timeslots 520a-520d, and general timeslot availability request 558 includes timeslots 525a-525d.

General timeslot availability requests 550, 552, 554, 556, 558 may be transmitted to delivery vehicles 505, 510, 515, 520, 525 consecutively. In some examples, one general timeslot availability request 550, 552, 554, 556, 558 is transmitted to a corresponding delivery vehicle. Upon receiving a response or, in some examples, upon the expiration of a maximum amount of time (e.g., 15 minutes, an hour), a different vehicle timeslot request 550, 552, 554, 556, 558 may be transmitted to its corresponding delivery vehicle. Upon receiving a general timeslot availability request 550, 552, 554, 556, 558, a driver may accept (e.g., via the receiving computing device) one or more timeslots. The selection of a timeslot indicates that the delivery vehicle is available for deliveries during the corresponding timeslot.

Figure 5C:
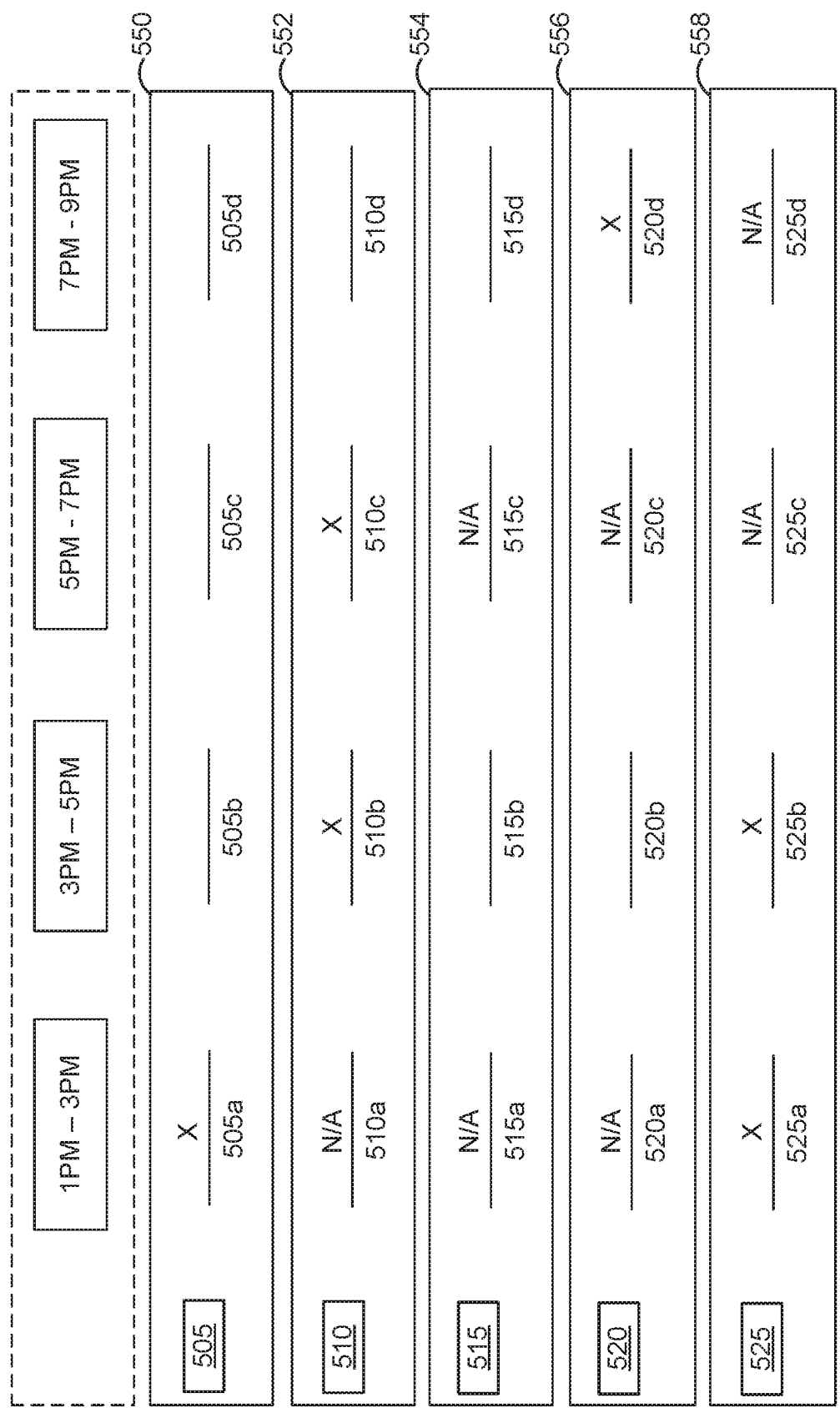
FIG. 5C illustrates a diagram of acceptances to the delivery vehicle timeslot requests of FIG. 5A in accordance with some embodiments.

For example, the driver of vehicle 505 may, upon receiving vehicle timeslot request 550, select (e.g., click on) one or more timeslots 505a-505d to indicate availability for deliveries during the selected timeslots. As illustrated in FIG. 5C, timeslot 505a has been selected for delivery vehicle 505. In this example, timeslot 510a for vehicle timeslot request 552 is not available, while timeslots 510b-510d are available. Timeslot 510a may not be available because, in some examples, the timeslot was already assigned to delivery vehicle 505. As illustrated, timeslots 510b and 510c have been selected.

General timeslot availability request 554 includes timeslots 515a and 515c with no availability (i.e., the timeslots may not be accepted) and timeslots 515b and 515d with availability. In this example, the driver of delivery vehicle 515 does not select any available timeslots. This may be, for example, because the driver is not available to make deliveries during the only available timeslots.

General timeslot availability request 556 is transmitted to delivery vehicle 520 and includes timeslots 520a and 520c with no availability and timeslots 520b and 520d with availability. For example, general timeslot availability request 556 may have been transmitted to delivery vehicle 520 because at least one timeslot 515a and 515c of general timeslot availability request 554 were not selected. The driver of delivery vehicle 520, in this example, selects timeslot 520d, but does not select timeslot 520b. In some examples, although timeslot 505a for general timeslot availability request 550 was selected, additional orders for delivery may have been received thereby requiring another driver during that same timeslot. Thus, general timeslot availability request 556 is transmitted with available timeslots 525a and 525b, but not availability during timeslots 525c and 525d. The driver for delivery vehicle 525 selects timeslots 525a and 525b. Upon selection of timeslots (via, e.g., a touchscreen display of the computing device), the computing device may transmit, to delivery management computing device 102, the selection of timeslots. For example, the selection of timeslots may be identified in a general timeslot availability response 406 message.

FIGS. 6A-6I illustrate various views of an application 600 that may be executed by, for example, delivery management computing device 102. Application 600 may include a graphical user interface (GUI) that is displayed, for example, on display 206. Application 600 may allow a dispatcher, such as an associate of a retailer, to manage the assignment of drivers to deliveries. For example, when an order is received for delivery during a future timeslot, Application 600 allows the dispatcher to find and assign a driver before the requested timeslot. As an example, orders received for deliveries during a particular timeslot may be assigned to drivers two hours before the start of the timeslot.

Assigning an order to a driver may cause delivery management computing device 102 to transmit timeslot availability requests, such as general timeslot availability requests 404 and surged price timeslot availability requests 414, to one or more drivers operating delivery vehicles 120. If the timeslot availability requests are not accepted (e.g., a response is not received within a period of time, such as 15 minutes), Application 600 may display an indication that the offer was not accepted, thereby allowing the dispatcher to assign the delivery to another driver. In some examples, the assignment of the next driver is automatic. For example, delivery management computing device 102 may select a next driver from a driver list and transmit a timeslot availability request to that next driver.

In some examples, Application 600 allows a dispatcher to cancel an order assignment to a driver. In some examples, Application 600 displays an estimated amount of time before a driver reaches a delivery destination. For example, delivery management computing device 102 may receive GPS data from the driver, and may calculate an estimated arrival time based on the received GPS data and delivery address. Application 600 may display the estimated arrival time. Application 600 may also facilitate the payment of fees to drivers, such as base fees or surged fees accepted by the driver. For example, upon delivery of one or more orders, Application 600 may allow the dispatcher to initiate the payment to the driver.

Figure 6A:
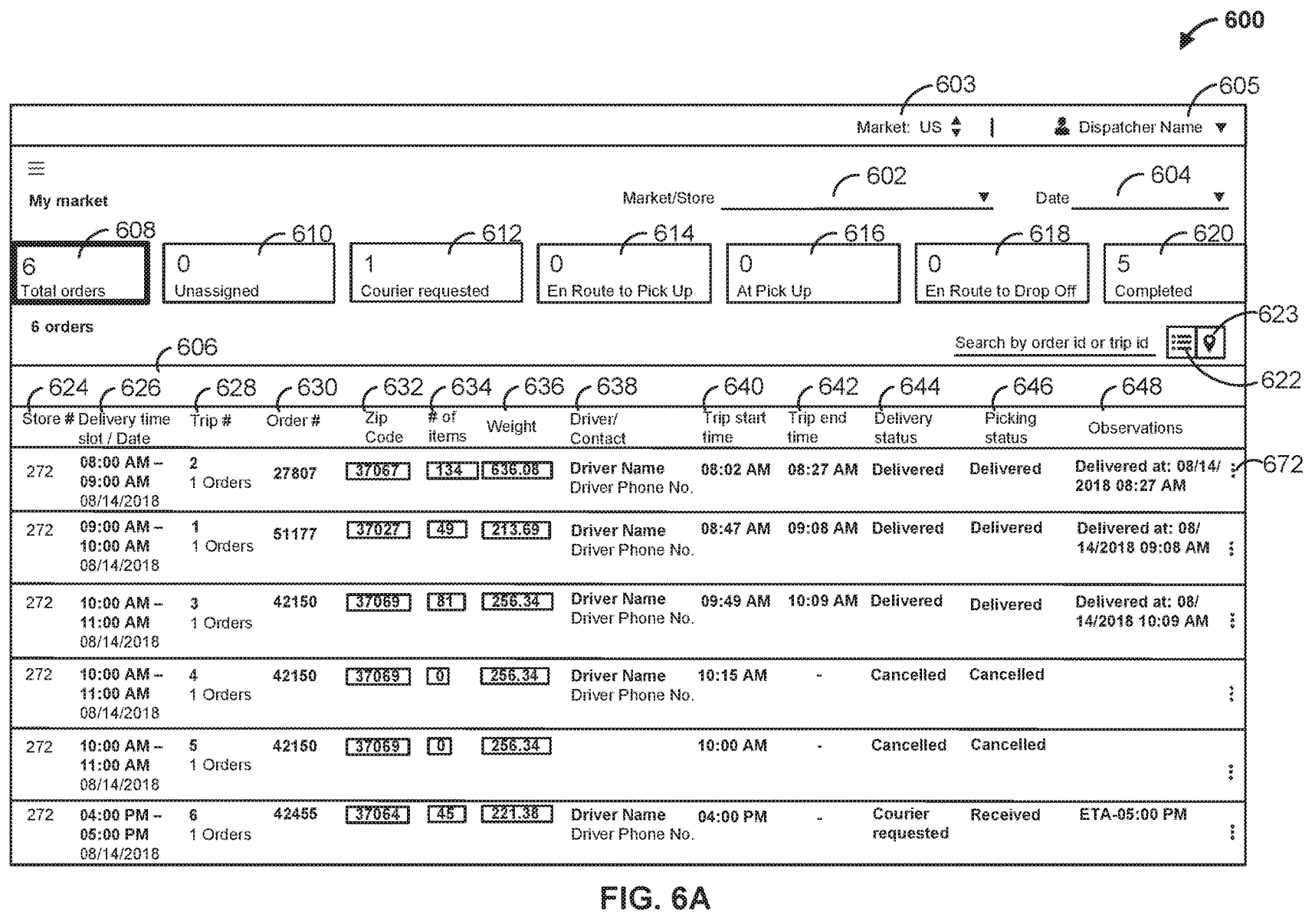

As illustrated in FIG. 6A, Application 600 includes a country market selection icon 603, a local market/store selection icon 602, and a date selection icon 604. Country market selection icon 603 allows for the selection of a larger market, such as a country. Market/store selection icon 602 allows for the selection of a more local market or store, such as first market 340 or first store 342. Date selection icon 604 allows for the selection of a date, such as "Today," a specific date, or a specific date range, for example. Application 600 also includes delivery options icon 672 for each delivery, which will be described in further detail with resent to FIG. 6I. Application 600 further includes a plurality of tab icons including total order tab icon 608, unassigned tab icon 610, courier requested tab icon 612, enroute-to-pick-up tab icon 614, at-pick-up tab icon 616, enroute-to-dropoff tab icon 618, and completed tab icon 620.

The selection of one of the plurality of tab icons causes the display of deliveries in delivery pane 606 based on the settings of country market selection icon 603, market/store selection icon 602, and date selection icon 604. For example, a user may select "U.S." for country market selection icon 603, a local market such as first market 340 for market/store selection icon 602, and "Today" for date selection icon 604. The user may then select total orders tab icon 608, which will cause the display of all orders in delivery pane 606.

In this example, when total orders tab icon 608 is selected (e.g., click on), delivery pane 606 displays, for each order, a store number (e.g., ID) 624, a delivery timeslot 626, a trip number 628, an order number 630, a zip code 632, a number of items 634, a weight 636, driver/contact data 638, a trip start time 640, a trip end time 642, a delivery status 644, a picking status 646, and observations data 648. Store number 624 identifies a store within the market selected by market/store selection icon 602 from which the items for the order are to be picked up from. Delivery timeslot 626 identifies a timeslot during which the corresponding order is to be delivered. Trip number 628 identifies the delivery trip of a driver associated with one or more orders being delivered during the delivery trip. The order number 630 identifies the order being delivered. Zip code 632 identifies the zip code of the delivery destination of the order. Number of items 634 identifies the number of items for each order, and weight 636 identifies the weight of the order (e.g., the weight of each item of the order added together).

Driver/contact data 638 identifies the name of the driver, and a contact phone number (e.g., mobile phone number) for the driver. Trip start time 640 identifies the time the driver began the trip identified by trip number 628. The start time may be, for example, the time the driver arrives at the store identified by store number 624 to pick up the items being delivered on the trip. Trip end time 642 identifies the time the driver ends the trip identified by rip number 628. The end time may be the time the driver completes deliver of the last order associated with the current trip, or may be when the driver arrives back at the store after delivering all of the orders, for example.

Delivery status 644 identifies a status for the order, such as "Assigned," "Delivered," "Cancelled," "Courier requested," "Enroute to pick up," "Enroute to drop off," "At pickup," or "Unassigned," for example. A status of "Assigned" indicates that the order has been assigned to a driver. A status of "Delivered" indicates that the order was delivered (e.g., completed), whereas a status of "Cancelled" indicates that the order was cancelled. For example, the customer may cancel and order online (on the retailer's web site), or by calling the retailer. A status of "Courier requested" indicates that a request for delivery is pending with a driver. For example, it may indicate that a general timeslot availability request 404 or surged timeslot availability request 414 has been transmitted to one or more drivers, but a response accepting the request has not yet been received. A status of "Enroute to pickup" indicates that the driver is enroute to pick up the items from the store for delivery, whereas a status of "Enroute to dropoff" indicates that the driver is enroute to deliver the order. A status of "At pickup" indicates that the driver has arrived at the store to pick up the items for delivery, and a status of "Unassigned" indicates that no driver has been assigned to the order.

Picking status 646 identifies whether the items to be delivered for the order have been picked for delivery. For example, picking status 646 may identify whether the items to be delivered have been picked and placed in a container for deliver from the store identified by store number 624.

Observations data 648 identifies dispatcher notes, such as an estimated time of arrival (ETA) or a delivery timestamp (e.g., delivery date and time). In some examples, observations data 648 identifies a date and time the driver delivered the order. For example, upon delivering an order, a driver may send a transmission from an associate device to delivery management computing device 102 that the order has been delivered. Delivery management computing device 102 may identify a date and time that the transmission is received, and may display the date and time to the dispatcher.

Referring back to the plurality of tab icons, a selection of unassigned tab icon 610 causes a display of unassigned orders. For example, out of all the order displayed when total orders tab icon 608 is selected, only those that have a delivery status 644 of "Unassigned" are displayed if the unassigned tab icon 610 is selected. Similarly, a selection of courier requested tab icon 612 causes only unassigned orders to be displayed. A selection of the enroute-to-pick-up tab icon 614 causes only orders with a delivery status 644 of "Enroute to pickup" to be displayed, and a selection of the at-pick-up tab icon 616 causes only orders with a delivery status 644 of "At pickup" to be displayed. A selection of the enroute-to-dropoff tab icon 618 causes only orders with a delivery status 644 of "Enroute to dropoff" to be displayed, and a selection of completed tab icon 620 causes only orders with a delivery status 644 of "Delivered" to be displayed.

In addition, each of the plurality of tab icons may display a number of orders corresponding to that tab icon. In this example, total order tab icon 608 indicates 18 total orders. Unassigned tab icon 610 indicates zero unassigned orders, courier requested tab icon 612 indicates 1 order where a courier has been requested, enroute-to-pick-up tab icon 614 indicates zero orders where the driver is enroute to pick up the items for delivery, at-pick-up tab icon 616 indicates zero orders where the driver is at the pickup location, enroute-to-dropoff tab icon 618 indicates zero orders where the driver is enroute to delivery an order, and completed tab icon 620 indicates 14 orders that have been delivered (e.g., completed).

Figure 6B:
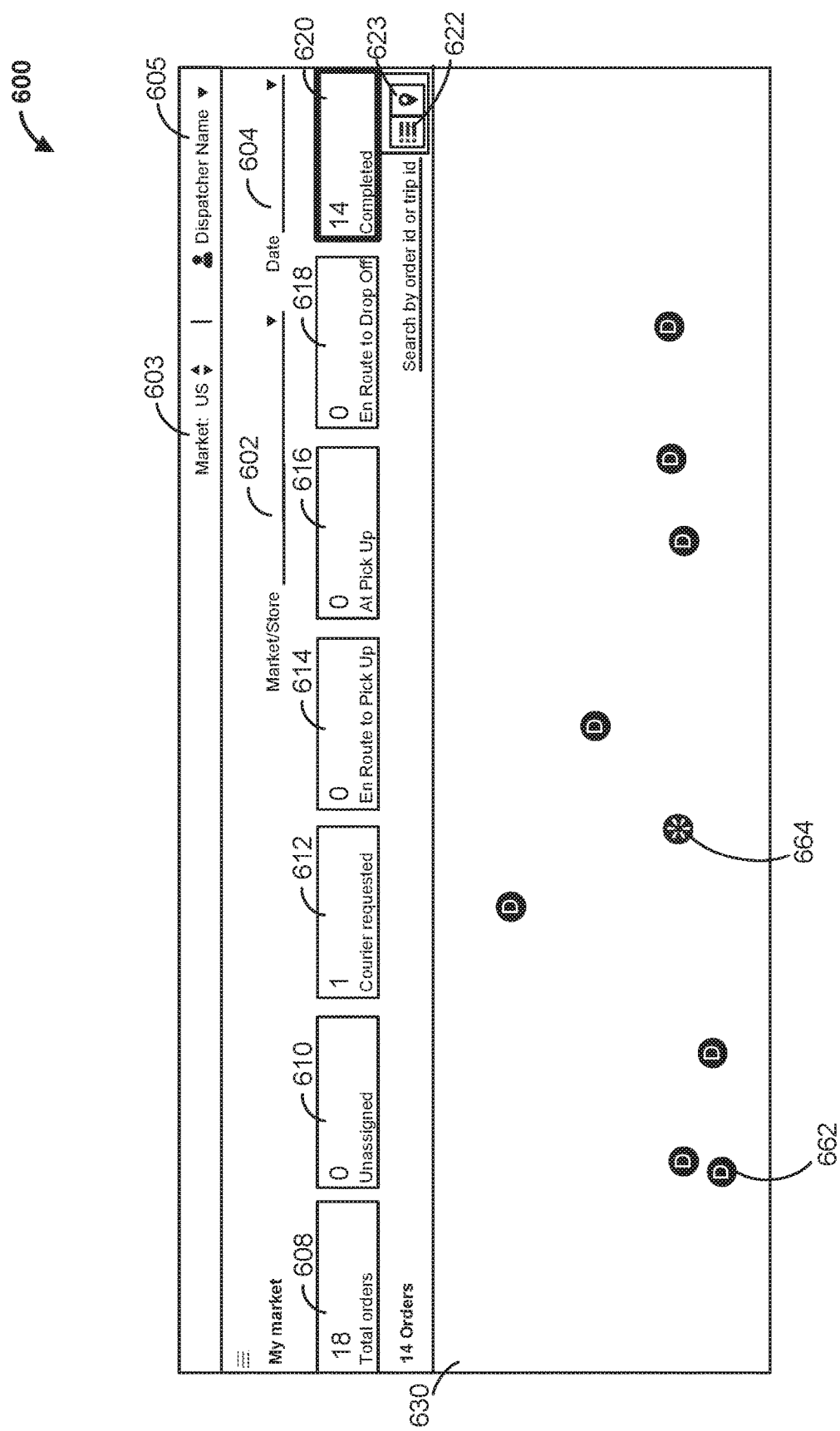
FIG. 6B illustrates a map view of the application of FIG. 6A that may be executed by the delivery management computing device of FIG. 1 in accordance with some embodiments.

Application 600 also includes list view icon 622 and map view icon 623. The selection of list view icon 622 displays the orders in list form, as shown in FIG. 6A. Selection of map view icon 623, however, shows the deliveries on a map, as illustrated in FIG. 6B.

As illustrated in FIG. 6B, orders are displayed on a map 630 when map view icon 623 is selected. In this example, delivery icons 662 and store icons 664 are shown on the map 630. The delivery icons 662 and the store icons are positioned on the map based upon their respective addresses. For example, each delivery icon 662 is positioned on the map according to the delivery address associated with its corresponding order, and each store icon 664 is positioned on the map according to its address.

Based on which of the plurality of tab icons is selected, corresponding delivery icons 662 are displayed. In FIG. 6B, completed tab icon 620 is selected. As such, delivery icons 662 indicate only deliveries that have been completed. If, for example, total orders tab icon 608 is selected, then delivery icons 662 for all orders would be displayed on map 630.

Figure 6C:
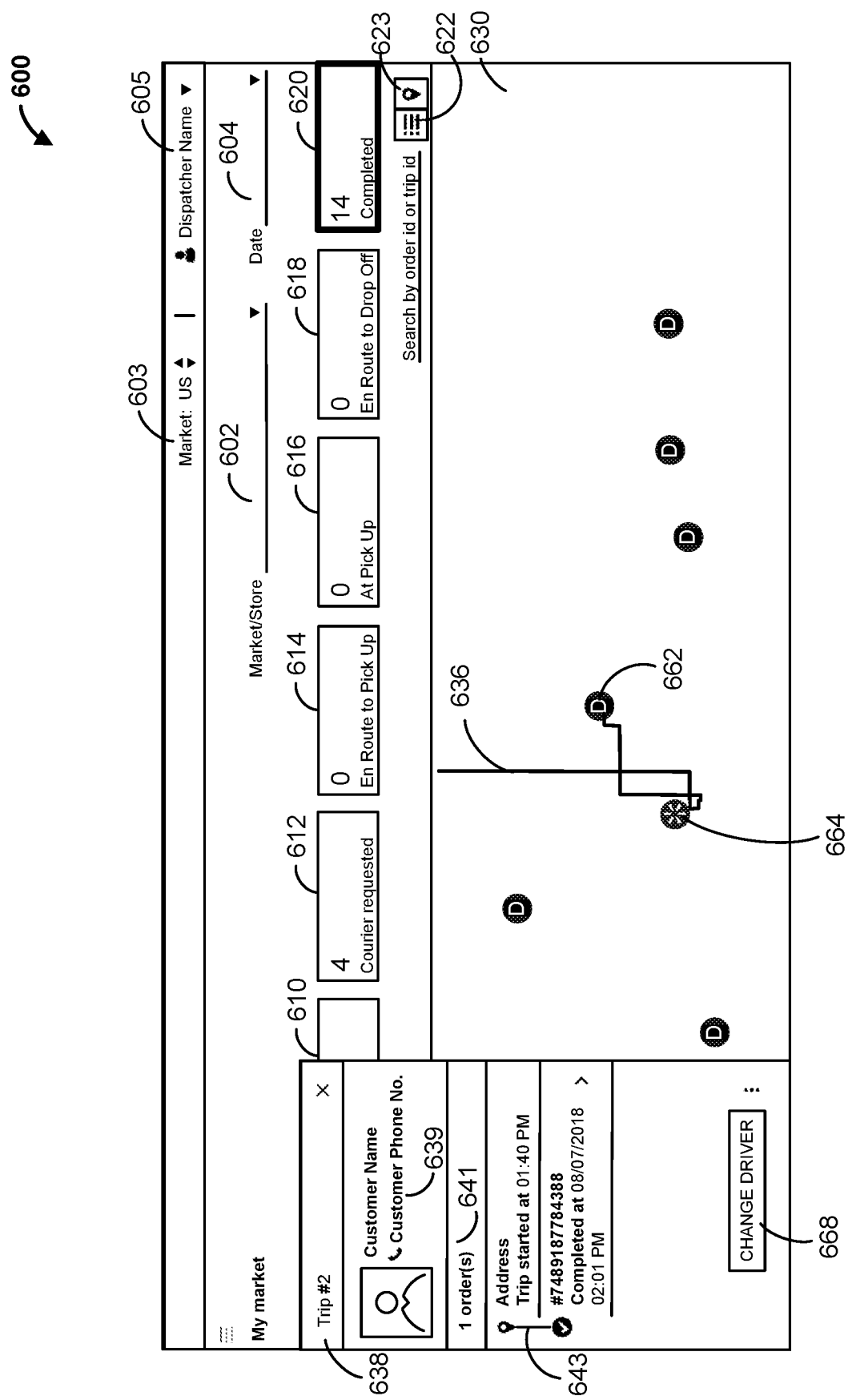
FIG. 6C illustrates delivery routes taken along the map of FIG. 6B of the application of FIG. 6A that may be executed by the delivery management computing device of FIG. 1 in accordance with some embodiments.

FIG. 6C illustrates the results of selecting a delivery icon 662. In this example, a route taken 636 by a driver is displayed. In this example, the route taken 636 indicates that the driver first arrived at store icon 664, such as to pick up the items for delivery, and then proceeded to the delivery address for delivery icon 662. In addition, in response to selecting a delivery icon 662, delivery details 638 may be displayed. Delivery details 638 may include a customer name and contact phone number 639, a number of orders for the customer 641, and trip details 643. Trip details 643 may indicate a trip start time and a delivery status, for example. Trip details 643 also includes a change driver icon 668, which allows the dispatcher to assign the delivery to a different driver. For example, if a driver has yet to pick up the items from the store for delivery (e.g., as may be indicated by delivery status 644), the dispatcher may select change driver icon 668 to assign the delivery to another driver.

In response to selecting the change driver icon 668, a window may be displayed where the dispatcher can select another driver to assign the delivery to. By selecting a new driver, delivery management computing device 102 may transmit a cancellation message to the original driver, and transmit a general timeslot availability request 404 message or surged price timeslot availability request 414 message to the new driver. In some examples, upon selecting change driver icon 668, delivery management computing device 102 automatically changes the assigned driver. For example, delivery management computing device 102 may select a next driver from a driver list to transmit a general timeslot availability request 404 message or surged price timeslot availability request 414 message to.

Figure 6D:
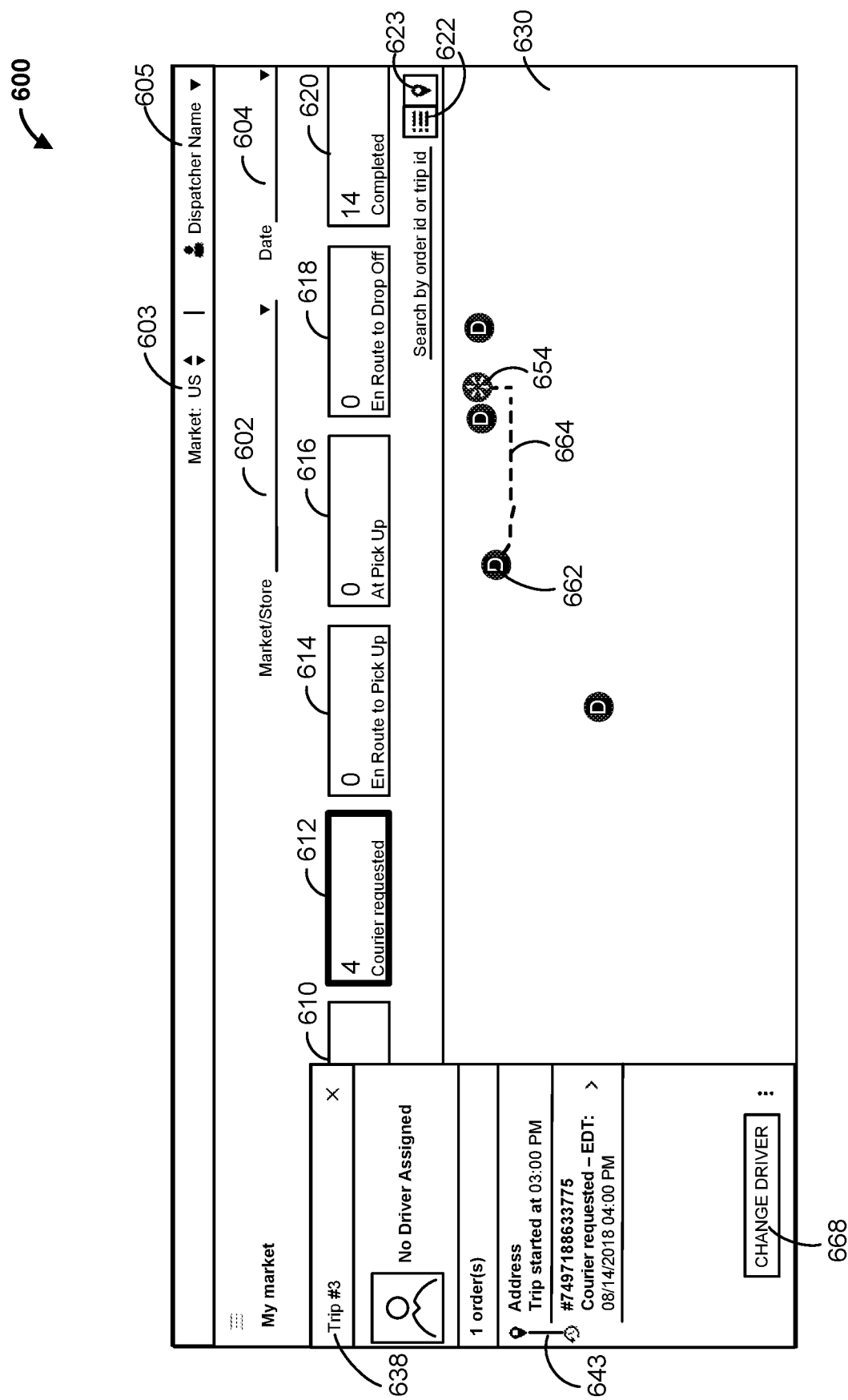
FIG. 6D illustrates estimated delivery routes along the map of FIG. 6B of the application of FIG. 6A that may be executed by the delivery management computing device of FIG. 1 in accordance with some embodiments.

FIG. 6D illustrates results of selecting the courier request icon tab 612 in map view (i.e., when map view icon 623 is selected). In this view, map 630 displays only deliveries for which a courier (e.g., driver) has been requested. In addition, in this view, if a delivery icon 662 is selected, an expected route 646 for that delivery is displayed. In this example, selecting delivery icon 662 causes the display of expected route 646 from delivery icon 662 to store icon 654. Delivery management computing device 102 may determine expected route 646 based on, for example, a current location of delivery vehicle 120 (based, e.g., on GPS data), and the address of the store corresponding to store icon 664. The expected route 646 may be based on a pre-determined route for a trip. Expected routes 646 may also be displayed in other views when delivery icons 662 are selected, such as when enroute to pick up tab icon 614, at pickup tab icon 616, or enroute to drop off tab icon 618 is selected. In addition, when a delivery icon 662 is selected, delivery details 638 may be displayed as well.

Figure 6E:
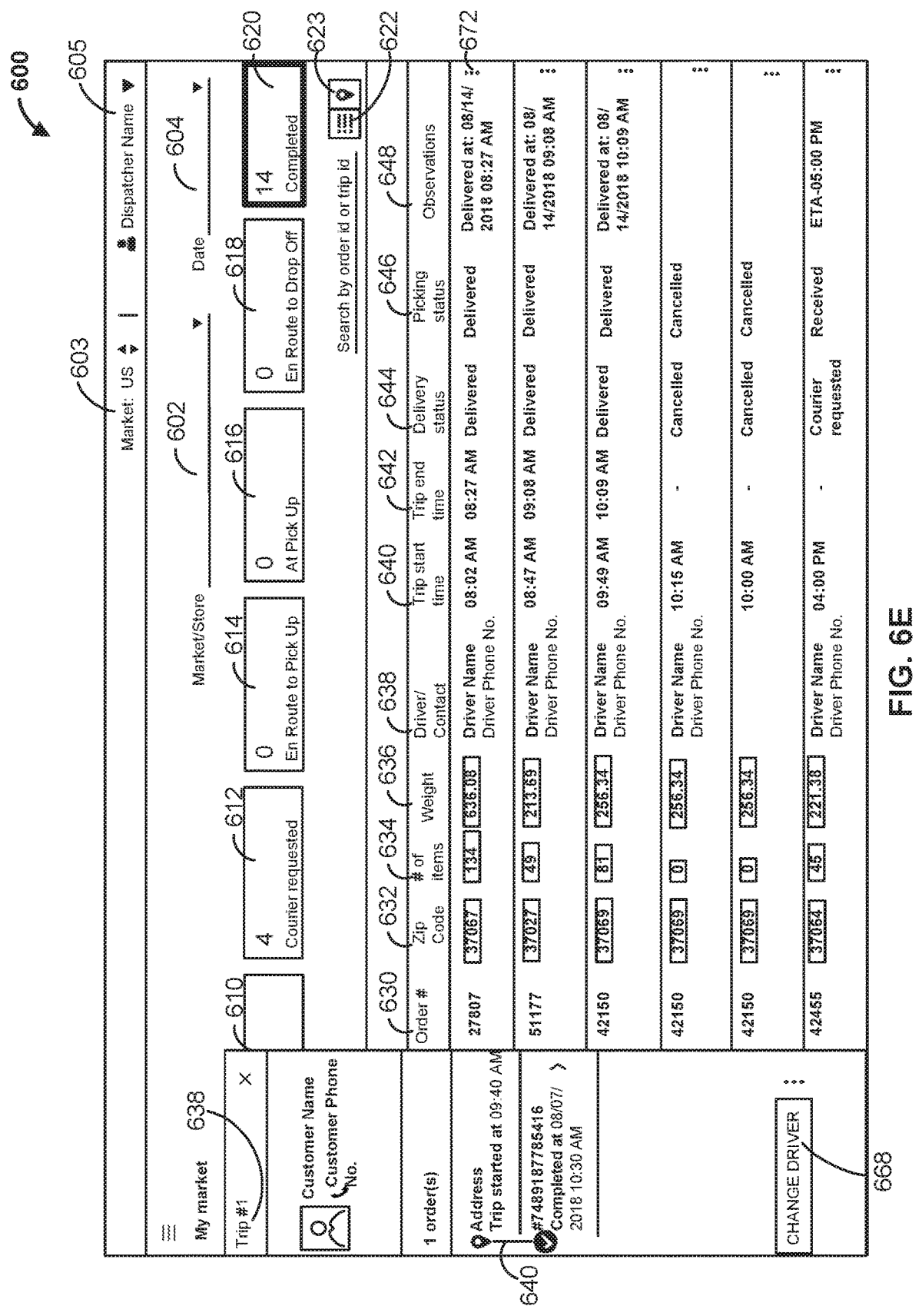
Figure 6F:
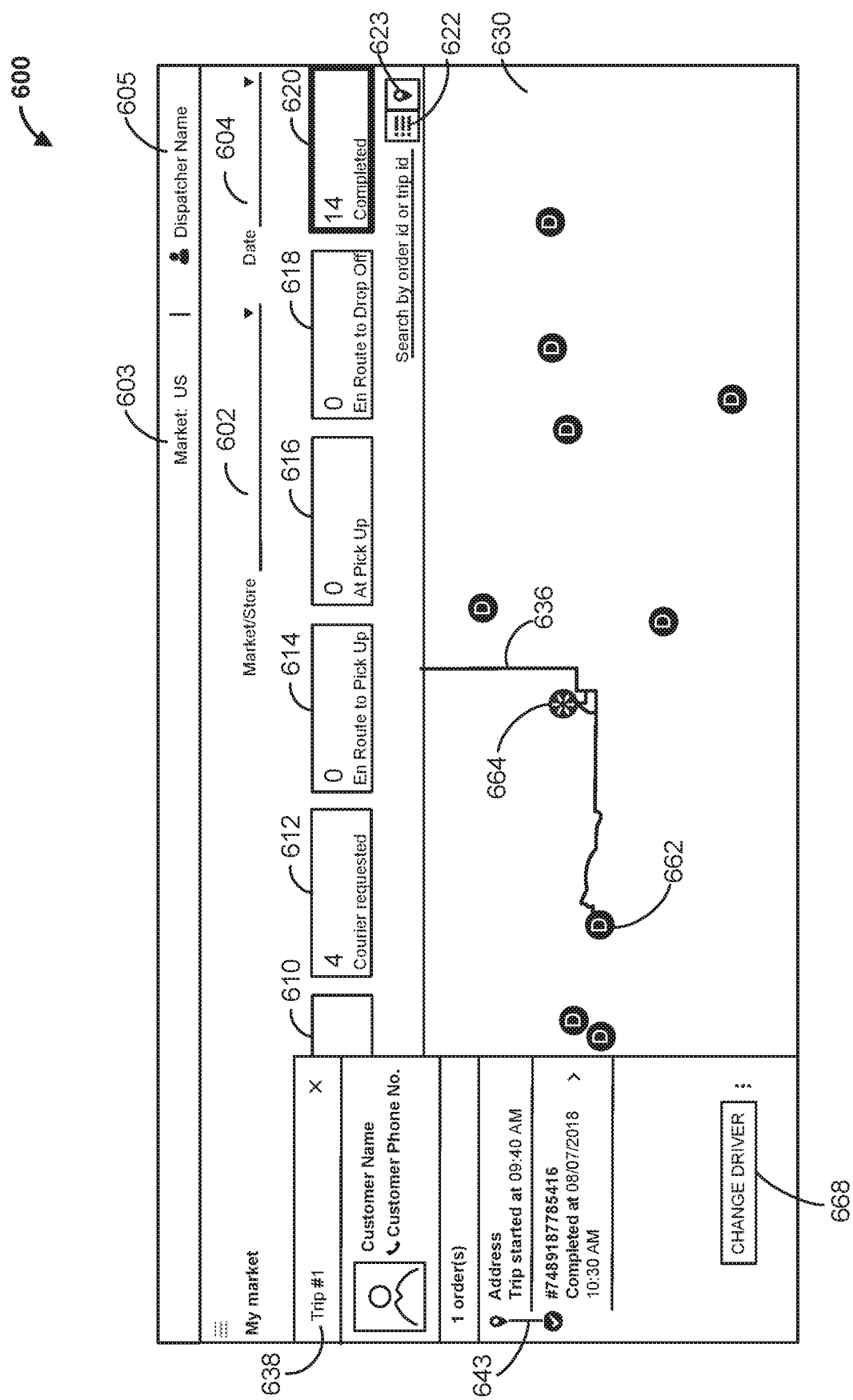
FIG. 6F illustrates delivery trip details in the map view of FIG. 6B for deliveries of the application of FIG. 6A that may be executed by the delivery management computing device of FIG. 1 in accordance with some embodiments.

FIG. 6E illustrates deliveries in list form (e.g., based on the selection of list view icon 622) when completed tab icon 620 is selected. The listed deliveries are deliveries that have been completed. For example, each order in this example has a delivery status 644 of "Delivered." Selecting a particular order in this view may also result in the display of delivery details 638. An order may be selected, for example, by clicking on the order number identified by order number 630. If a dispatcher where to select the map view by clicking on map view icon 623, the same deliveries (e.g., completed deliveries) would be shown on a map, such as is illustrated in FIG. 6F. FIG. 6F also illustrates a route taken 636 by a driver to store icon 664, then from store icon 664 to delivery icon 662, corresponding to the route taken for the driver delivering the selected order in FIG. 6E.

Figure 6G:
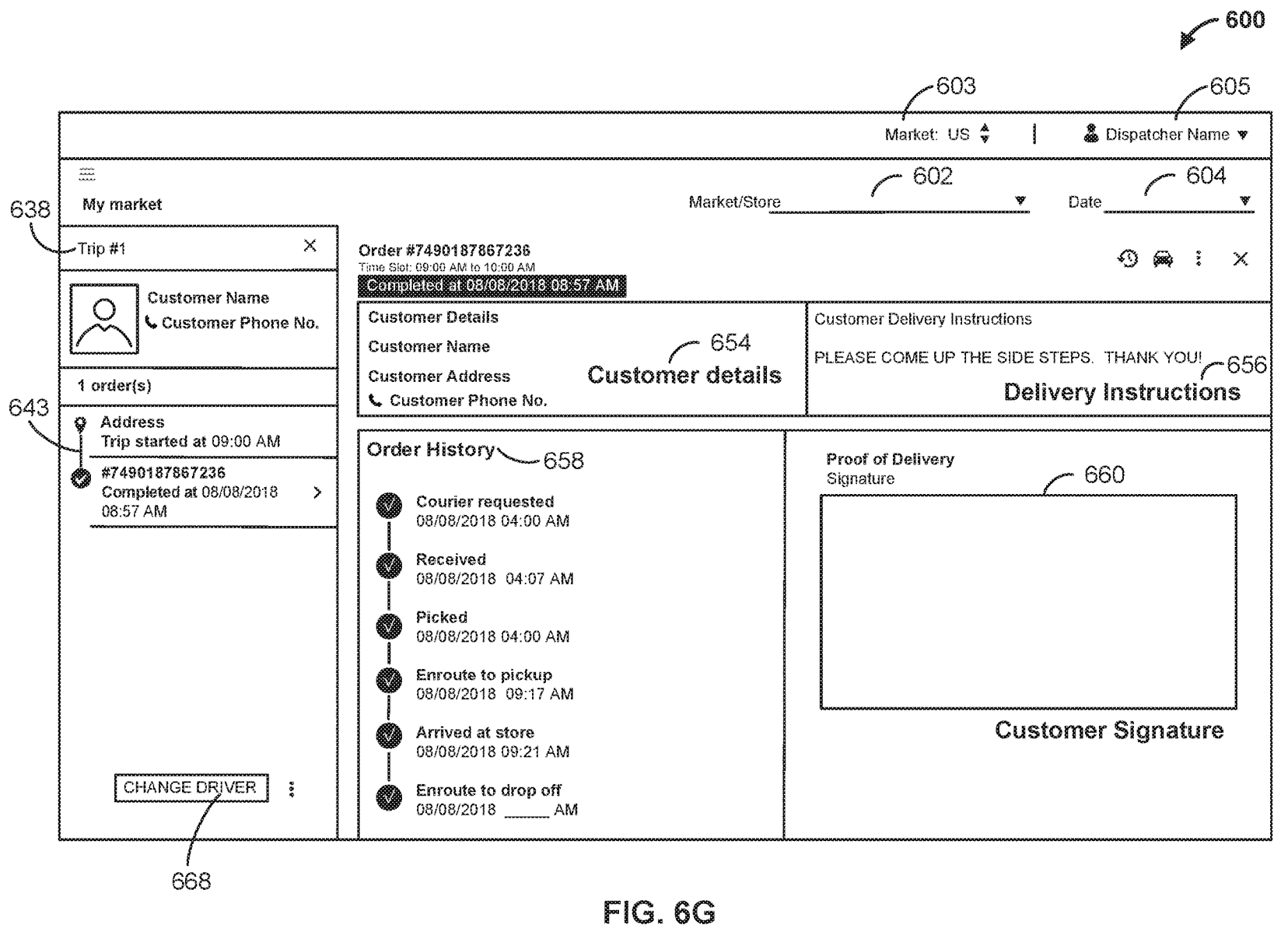

Selecting trip details 643 may bring up a display (e.g., a window) of additional order details. The dispatcher may select trip details 643 when either in list view (e.g., list view icon 622 is selected) or in map view (e.g., map view icon 623 is selected). For example, as illustrated in FIG. 6G, the selection of (e.g., clicking on) trip details 643 may cause the display of customer details 654, delivery instructions 656, order history 658, and a customer signature window 660 to be displayed. Customer details 654 may include additional notes by or for the customer, in addition to the customer name and contact information, such as the customers phone number. Delivery instructions 656 may identify any instructions the customer has provided for delivering the order. Order history 658 may include further information, such as when the driver was requested, when a response was received from the driver accepting the request, when the items were picked at the store for delivery, when the driver was in route to pick up the items for delivery at the store, when the driver arrived at the store to pick up the items for delivery, and when the driver left the store to deliver the items.

Customer signature window 660 illustrates an electronic signature of the customer, if one was obtained with the order was delivered. For example, when delivering the order to a customer, the driver may ask the customer to sign for the order. The signature may be captured by the associate device, or any other suitable electronic device capable of capturing signatures. The signature may then be transmitted to delivery management computing device 102, which may display it in customer signature window 660.

FIG. 6H illustrates a list view of deliveries when the unassigned tab icon 610 is selected. In this example, only deliveries that have yet to be assigned to a driver are listed. As illustrated, delivery pane 606 displays, for each order, store number (e.g., ID) 624, delivery timeslot 626, trip number 628, order number 630, zip code 632, number of items 634, weight 636, delivery status 644, picking status 646, and observations data 648. Driver/contact data 638, trip start time 640, and trip end time 642, however, are not displayed because a driver has not yet been assigned to deliver the order. To assign a driver, a dispatcher may select assign driver icon 670. In response to selecting assign driver icon 670, a window may be displayed that allows the dispatcher to select a driver. For example, the window may display a list of drivers from a driver list. In some examples, selecting assign driver icon 670 automatically attempts to assign a driver to the order, such as from a driver list. For example, delivery management computing device 102 may select a next driver from a driver list to transmit a general timeslot availability request 404 message or surged price timeslot availability request 414 message to.

FIG. 6H also illustrates delivery options icon 672, which may be displayed in list view for any tab that is selected. In response to selecting delivery options icon 672 for any order, a window with various options for the delivery may be displayed. For example, FIG. 6I displays order options 674 and trip options 684 which are displayed in response to selection of delivery options icon 672. Order options 674 may include reschedule icon 676, add driver icon 678, release order icon 680, and cancel order icon 682. Reschedule icon 676 allows the dispatcher to reschedule a delivery. For example, the delivery can be rescheduled to another timeslot (e.g., a later timeslot). As a result, the rescheduled delivery may be assigned to another driver (e.g., a driver that accepts a request to delivery orders during the other timeslot.

The add driver icon 678 allows the dispatcher to add a second driver to a delivery. For example, a first driver operating a first delivery vehicle 120 may arrive at a store to pick up an order. If the order contains many items which do not fit into the first driver's delivery vehicle, the dispatcher may add a second driver that operates a second delivery vehicle 120 to the delivery. The items that do not fit into the first driver's delivery vehicle 120 may be instead be delivered by the second delivery driver. In response to selecting the add driver icon 678, a list of drivers may be presented from which the dispatcher can select a second driver to add to the delivery.

The release order icon 680 allows a dispatcher to release a driver from a current delivery assignment. For example, if multiple drivers are assigned to an order, but after arriving at the store, a smaller number of drivers are needed to deliver the order, one or more orders may be released from the order. In some examples, upon selecting the release order icon 680, a list of drivers currently assigned to the delivery is displayed. The dispatcher may select one or more drivers to be released from the order. The cancel order icon 682 allows a dispatcher to cancel an order. Upon selecting the cancel order icon 682, a window prompting for a reason for the cancellation may be displayed. The dispatcher may select a preconfigured reason for the cancellation, or in some examples may provide their own explanation. In response, a cancellation message may be transmitted to any drivers assigned to the cancelled order.

Trip options 684 include change driver icon 686, cancel trip icon 688, force complete icon 690, and release trip icon 692. Change driver icon 686 allows the dispatcher to assign a different driver to a trip that includes one or more orders for delivery. For example, a dispatcher may assign a different driver to an order if an originally assigned order does not arrive on time to pick up the order for delivery. In response, a cancellation message may be transmitted to the original driver, and a request message may be transmitted to a second driver. The dispatcher may select the second driver from a window listing available drivers for the timeslot of the delivery, or, in some examples, delivery management computing device 102 may automatically select the second driver, such as from a driver list. Cancel trip icon 688 allows a dispatcher to cancel a trip. Upon cancellation of the trip, a cancellation message is transmitted to any drivers scheduled to deliver an order on the cancelled trip.

Force complete icon 690 allows a dispatcher to mark a trip as complete (e.g., all orders delivered). For example, a dispatcher may mark a trip as complete if a delivery happens outside of the knowledge of the system. The release trip icon 692 allows a dispatcher to release all drivers from a trip. For example, upon selecting release trip icon 692, a cancellation message may be transmitted to all drivers assigned orders on the cancelled trip.

Figure 7:
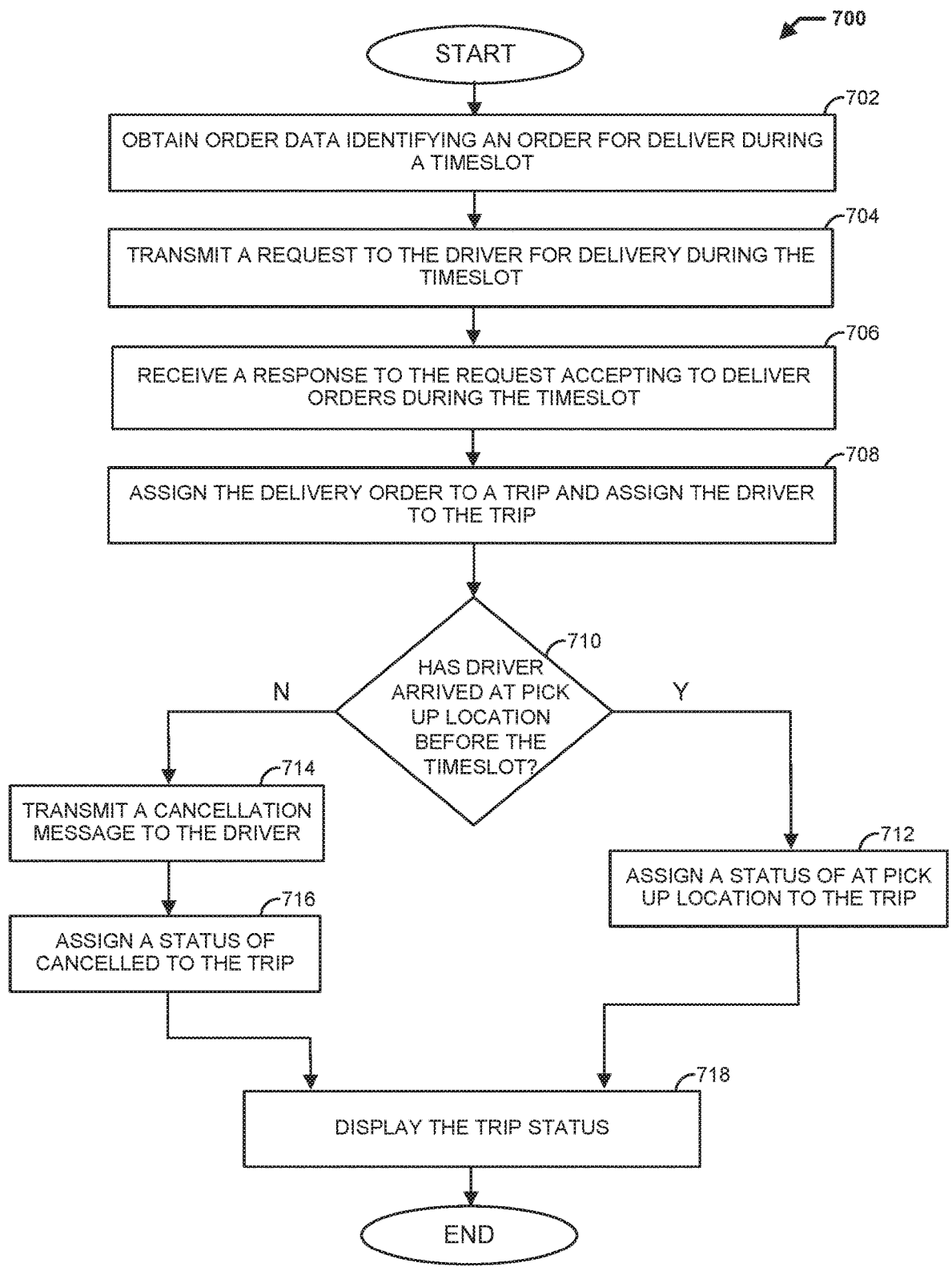
FIG. 7 is a flowchart of an example method that can be carried out by the delivery management computing device of FIG. 1 in accordance with some embodiments.

FIG. 7 if a flowchart of an example method 700 that can be carried out by, for example, the delivery management computing device 102 of FIG. 1. Beginning at step 702, order data identifying an order for delivery during a timeslot is obtained. For example, delivery management computing device 102 may obtain order data from web server 104, where a customer placed an online order for delivery. The order data may identify a date and time range for delivery of the order at a delivery address. At step 704, a request to deliver the order during the timeslot is transmitted to a driver. For example, delivery management computing device 102 may transmit a general timeslot availability request 404 message to a delivery vehicle 120. Proceeding to step 706, a response accepting the delivery request is received from the driver. For example, delivery management computing device 102 may receive a general timeslot availability response 406 from the delivery vehicle 120. At step 708, the delivery order is assigned to a trip, and the drive is assigned to the trip. For example, delivery management computing device 102 may assign a delivery order 630 to a trip number 628, and assign a driver 638 to the trip number 628.

Proceeding to step 710, a determination is made as to whether the driver has arrived at the pickup location before the start of the timeslot. For example, based on GPS data, delivery management computing device 102 can determine whether delivery vehicle 120 has arrived at a delivery address 312 for a first order 304 identified by order data 302. If the driver has arrived at the pickup location, the method proceeds to step 712, where a status of "At Pickup Location" is assigned to the trip. Otherwise, if the driver has not arrived at the pickup location, the method proceeds to step 714, where a cancellation message is transmitted to the driver. From step 714, the method proceeds to step 716, where the trip is assigned a status of "Cancelled."

From step 712 and step 716, the method proceeds to step 718, where the trip status is displayed. For example, delivery management computing device 102 may cause application 600 to display a delivery status 644 for a trip number 628. The method then ends.

Figure 8:
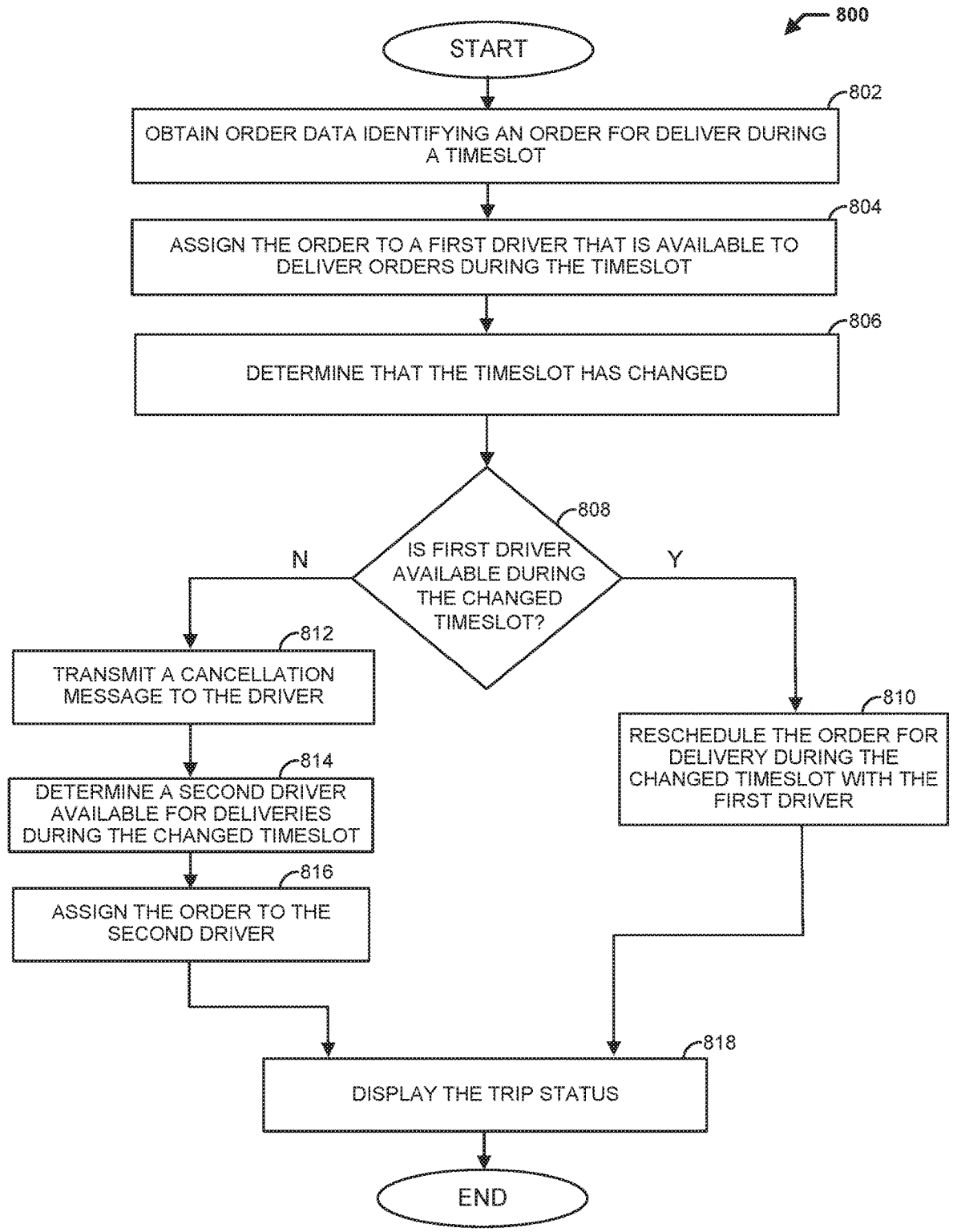
FIG. 8 is a flowchart of another example method that can be carried out by the delivery management computing device of FIG. 1 in accordance with some embodiments.

FIG. 8 is a flowchart of an example method 800 that can be carried out by, for example, the delivery management computing device 102 of FIG. 1. Beginning at step 802, order data identifying an order for delivery during a timeslot is obtained. For example, delivery management computing device 102 may obtain order data from web server 104, where a customer placed an online order for delivery. The order data may identify a date and time range for delivery of the order at a delivery address. At step 804, the order is assigned to a first driver that is available to deliver orders during the timeslot. For example, delivery management computing device 102 may transmit general timeslot availability request 404 messages to drivers of delivery vehicles 120 based on a driver list, until at least one general timeslot availability response 406 is received accepting the request. Delivery management computing device 102 may then assign the driver 638 to the order number 630. At step 806, a determination is made that the timeslot has changed. For example, a customer may call in and request a different delivery timeslot for their order. In some examples, the customer may change the delivery timeslot online, such as on the retailer's website.

Proceeding to step 808, a determination is made as to whether the first driver is available during the changed timeslot. For example, delivery management computing device 102 may transmit general timeslot availability request 404 messages to the first driver identifying the changed timeslot. Delivery management computing device 102 may determine if a general timeslot availability response 406 message is received within a maximum amount of time (e.g., 15 minutes). If the driver is available during the changed timeslot, the method proceeds to step 810. At step 810, the order is rescheduled for delivery during the changed timeslot for delivery with the first driver. For example, delivery management computing device 102 may change the delivery time slot/date 626 associated with an order number 630. Back at step 808, if the driver is not available during the changed timeslot, the method proceeds to step 812.

At step 812, a cancellation message is transmitted to the first driver. The cancellation message indicates that the delivery order is cancelled and that the driver is not to proceed with delivering the order. The method then proceeds to step 814 where a second driver is determined to be available for deliveries during the changed timeslot. For example, delivery management computing device 102 may transmit a general timeslot availability request 404 message to a second driver on a driver list, and receive a general timeslot availability response 406. In some examples, delivery management computing device 102 transmits a surged price timeslot availability request 414 to each driver in a driver list until a surged price timeslot availability response 416 is received. Proceeding to step 816, the order is assigned to the second driver. For example, delivery management computing device 102 may assign a second driver 638 to the order number 630.

Proceeding from either step 810 or step 818, the rescheduled order is displayed. For example, delivery management computing device 102 may cause Application 600 to display the updated driver 638 for the order number 630. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising
a database;
a communications network; and
a computing device communicatively coupled to the database and the communications network, the computing device being configured to:
obtain, from the database, order data identifying at least a first order for delivery during a timeslot;
transmit, to a first associate device via the communications network, a first request for deliveries from a pickup location to a delivery location for a first price during the timeslot, the first associate device including a transceiver to communicate via the communications network;
receive, from the first associate device via the communications network, a first response accepting the first request;
determine a first driver, driver acceptance rate, and driver acceptance position based on the first response;
generate driver data assigning the first driver to the first order;
store the driver data within the database;
receive, from the first associate device via the communications network, location data identifying a current position of the first associate device;
determine a delivery status based on the location data;
determine, based on the delivery status, whether the first driver has arrived at the pickup location before the timeslot;
in response to determining, based on the delivery status, that the first driver has not arrived at the pickup location before the timeslot:
transmit, to the first associate device via the communications network, a cancellation message cancelling the assignment of the first driver to the first order;
select a subsequent driver corresponding to a subsequent associate device based on the subsequent driver being included on a driver list, the driver list being generated using a machine learning algorithm, and the machine learning algorithm operates based on historical driver data including historical driver acceptance rates and an average acceptance position of drivers over a period; and
transmit and assign, to the subsequent associate device via the communications network, an adjusted first request, the adjusted first request including an adjusted timeslot based on the timeslot and an adjusted price based on the first price;
update the driver data within the database based on at least one of the delivery status and the assignment to the subsequent associate device; and
display, on a graphical user interface of the computing device via an application, the delivery status, the application including user-selectable icons for a user to select and transmit driver assignments, driver cancellations, and display tracking information of the first associate device and the subsequent associate device.

2. The system of claim 1, wherein the delivery status identifies that the first order was picked up at the pickup location before the timeslot.

3. The system of claim 2, wherein the computing device is configured to determine a trip end time based on the delivery status.

4. The system of claim 1, wherein the computing device is configured to:
determine a second driver from the driver list; and
assign the second driver to deliver at least a portion of the first order.

5. The system of claim 1, wherein the computing device is configured to:
determine that the first driver has picked up the first order from the pickup location based on the location data;
determine that the first order comprises at least one temperature sensitive item;
determine that a maximum amount of time has elapsed since the first driver left the pickup location; and
transmit a cancellation message to the first driver.

6. The system of claim 5, wherein the computing device is configured to:
transmit, to a second associate device, a second request to deliver the first order for the first price;
receive a second response accepting the second request;

determine a second driver based on the second associate device; and assign the second driver to the first order.

7. The system of claim 1, wherein the computing device is configured to:
determine that a maximum amount of time has passed since the first request was transmitted to the first associate device;
transmit to a second associate device, the first request to deliver the order for a second price; and
receive the first response accepting the first request from the second associate device.

8. The system of claim 1, wherein the computing device is configured to display a route taken by the first driver based on the location data.

9. The system of claim 1, wherein the order data identifies a delivery address for the first order, wherein the computing device is configured to:
determine an expected route based on the delivery address for the first order; and
display the expected route.

10. The system of claim 1, wherein the order data identifies a second order for delivery, wherein the computing device is configured to:
determine a second driver from a driver list;
transmit, to a second associate device, a second request to deliver the second order for a second price; and
display data indicating that a driver has been requested for the second order.

11. The system of claim 1, wherein the order data identifies a second order for delivery, wherein the computing device is configured to:
determine that the second order is to be delivered during the timeslot;
assign the first driver to the second order;
determine an estimated delivery time for the second order based on a delivery address of the first order; and
transmit the estimated delivery time for the second order to a customer device.

12. A method comprising:
obtaining, from a database, order data identifying at least a first order for delivery during a timeslot;
transmitting, to a first associate device via a communications network, a first request for deliveries from a pickup location to a delivery location for a first price during the timeslot, the first associate device including a transceiver to communicate via the communications network;
receiving, from the first associate device via the communications network, a first response accepting the first request;
determining a first driver, driver acceptance rate, and driver acceptance position based on the first response;
generating driver data assigning the first driver to the first order;
storing the driver data within the database;
receiving, from the first associate device via the communications network, location data identifying a current position of the first associate device;
determining a delivery status based on the assignment of the location data;
determining, based on the delivery status, whether the first driver has arrived at the pickup location before the timeslot;
in response to determining, based on the delivery status, that the first driver has not arrived at the pickup location before the timeslot;

transmitting, to the first associate device via the communications network, a cancellation message cancelling the assignment of the first driver to the first order;
selecting a subsequent driver corresponding to a subsequent associate device based on the subsequent driver being included on a driver list, the driver list being generated using a machine learning algorithm, and the machine learning algorithm operates based on historical driver data including historical driver acceptance rates and an average acceptance position of drivers over a period; and
transmitting and assigning, to the subsequent associate device via the communications network, an adjusted first request, the adjusted first request including an adjusted timeslot based on the timeslot and an adjusted price based on the first price;
updating the driver data within the database based on at least one of the delivery status and the assignment to the subsequent associate device; and
displaying, on a graphical interface of a computing device via an application, the delivery status, the application including user-selectable icons for a user to select and transmit driver assignments, driver cancellations, and display tracking information of the first associate device and the subsequent associate device.

13. The method of claim 12 further comprising:
determining a second driver from the driver list; and
assigning the second driver to deliver at least a portion of the first order.

14. The method of claim 12 further comprising:
determining that a second order is to be delivered during the timeslot;
assigning the first driver to the second order;
determining an estimated delivery time for the second order based on a delivery address of the first order; and
transmitting the estimated delivery time for the second to a customer device.

15. A non-transitory computer readable medium having instructions stored thereon, wherein the instructions, when executed by at least one processor, cause a device to perform operations comprising:
obtaining, from a database, order data identifying at least a first order for delivery during a timeslot;
transmitting, to a first associate device via a communications network, a first request for deliveries from a pickup location to a delivery location for a first price during the timeslot, the first associate device including a transceiver to communicate via the communications network;
receiving, from the first associate device via the communications network, a first response accepting the first request;
determining a first driver, driver acceptance rate, and driver acceptance position based on the first response;
generating driver data assigning the first driver to the first order;
storing the driver data within the database;
receiving, from the first associate device via the communications network, location data identifying a current position of the first associate device;
determining a delivery status based on the assignment of the location data;
determining, based on the delivery status, whether the first driver has arrived at the pickup location before the timeslot;

in response to determining, based on the delivery status, that the first driver has not arrived at the pickup location before the timeslot;

transmitting, to the first associate device via the communications network, a cancellation message cancelling the assignment of the first driver to the first order;

selecting a subsequent driver corresponding to a subsequent associate device based on the subsequent driver being included on a driver list, the driver list being generated using a machine learning algorithm, and the machine learning algorithm operates based on historical driver data including historical driver acceptance rates and an average acceptance position of drivers over a period; and transmitting and assigning, to the subsequent associate device via the communications network, an adjusted first request, the adjusted first request including an adjusted timeslot based on the timeslot and an adjusted price based on the first price;

updating the driver data within the database based on at least one of the delivery status and the assignment to the subsequent associate device; and displaying, on a graphical interface of a computing device via an application, the delivery status, the application including user-selectable icons for a user to select and transmit driver assignments, driver cancellations, and display tracking information of the first associate device and the subsequent associate device.

16. The non-transitory computer readable medium of claim 15 further comprising instructions stored thereon that, when executed by at least one processor, further cause the device to perform operations comprising:

determining a second driver from the driver list; and assigning the second driver to deliver at least a portion of the first order.

17. The non-transitory computer readable medium of claim 15 further comprising instructions stored thereon that, when executed by at least one processor, further cause the device to perform operations comprising:

determining that a second order is to be delivered during the timeslot;

assigning the first driver to the second order;

determining an estimated delivery time for the second order based on a delivery address of the first order; and transmitting the estimated delivery time for the second order to a customer device.

\* \* \* \* \*